(12) United States Patent
Zarichnyi

(10) Patent No.: US 12,367,615 B2
(45) Date of Patent: Jul. 22, 2025

(54) AUGMENTED REALITY DEVICE FOR BLURRING IMAGES AND OPERATING METHOD THEREOF

(71) Applicant: SAMSUNG ELECTRONICS CO., LTD., Suwon-si (KR)

(72) Inventor: Ihor Zarichnyi, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 18/117,297

(22) Filed: Mar. 3, 2023

(65) Prior Publication Data

US 2023/0298222 A1 Sep. 21, 2023

Related U.S. Application Data

(63) Continuation of application No. PCT/KR2023/001798, filed on Feb. 8, 2023.

(30) Foreign Application Priority Data

Mar. 16, 2022 (KR) .................. 10-2022-0032943

(51) Int. Cl.
*G06T 11/00* (2006.01)
*G06T 7/11* (2017.01)
(Continued)

(52) U.S. Cl.
CPC ............. *G06T 11/00* (2013.01); *G06T 7/11* (2017.01); *G06V 10/945* (2022.01); *G06V 20/20* (2022.01);
(Continued)

(58) Field of Classification Search
None
See application file for complete search history.

(56) References Cited

U.S. PATENT DOCUMENTS 9,292,973 B2 3/2016 Bar-Zeev et al.
11,727,675 B2 8/2023 Buchaca et al.
(Continued)

FOREIGN PATENT DOCUMENTS

KR 10-2018-0000018 A 1/2018
KR 10-2019-0041293 A 4/2019
(Continued)

OTHER PUBLICATIONS

International Search Report (PCT/ISA/210) and Written Opinion (PCT/ISA/237) issued by the International Searching Authority on May 9, 2023 in corresponding International Application No. PCT/KR2023/001798.

*Primary Examiner* — Jeffrey J Chow
(74) *Attorney, Agent, or Firm* — Sughrue Mion, PLLC

(57) ABSTRACT

Provided are an augmented reality device for improving work concentration and immersion of a user, and an operating method of the augmented reality device. The augmented reality device according to an embodiment of the disclosure may obtain a plurality of image frames by photographing a real scene by using a camera, may recognize a preset object from the plurality of image frames, may obtain a blur image in which an area other than an area of the at least one preset object from among entire area of the plurality of image frames is blurred, and may display the blur image.

15 Claims, 14 Drawing Sheets

(51) Int. Cl.
  *G06V 10/94* (2022.01)
  *G06V 20/20* (2022.01)
(52) U.S. Cl.
  CPC  *G06T 2200/24* (2013.01); *G06T 2207/20021* (2013.01); *G06T 2207/20092* (2013.01)

(56) References Cited

U.S. PATENT DOCUMENTS

| | | | |
|---|---|---|---|
| 2010/0208033 A1 | 8/2010 | Edge et al. | |
| 2018/0275394 A1 | 9/2018 | Yeoh et al. | |
| 2020/0034618 A1* | 1/2020 | Ikeda | G06F 3/0481 |
| 2020/0193559 A1* | 6/2020 | Sano | G06F 3/14 |
| 2021/0124177 A1 | 4/2021 | Yeoh et al. | |
| 2021/0182589 A1 | 6/2021 | Kim et al. | |
| 2021/0192816 A1* | 6/2021 | Watanabe | G06V 20/40 |
| 2021/0195120 A1* | 6/2021 | King | H04N 5/272 |
| 2021/0241432 A1 | 8/2021 | Li et al. | |
| 2021/0304431 A1* | 9/2021 | Wantland | G06T 5/77 |
| 2022/0270215 A1 | 8/2022 | Lee | |
| 2023/0186534 A1* | 6/2023 | Doken | G06V 30/1456 |
| | | | 345/633 |
| 2024/0320371 A1* | 9/2024 | Maeda | G06F 21/6254 |

FOREIGN PATENT DOCUMENTS

| | | |
|---|---|---|
| KR | 10-2019-0048241 A | 5/2019 |
| KR | 10-2019-0072762 A | 6/2019 |
| WO | 2016/013858 A2 | 1/2016 |
| WO | 2021/045599 A1 | 3/2021 |
| WO | 2023/171734 A1 | 9/2023 |

\* cited by examiner

AUGMENTED REALITY DEVICE FOR BLURRING IMAGES AND OPERATING METHOD THEREOF

CROSS-REFERENCE TO RELATED APPLICATIONS

This application is a Continuation Application of International Application PCT/KR2023/001798 filed on Feb. 8, 2023, which claims benefit of Korean Patent Application No. 10-2022-0032943, filed on Mar. 16, 2022, at the Korean Intellectual Property Office, the disclosures of which are incorporated herein in their entireties by reference.

TECHNICAL FIELD

The disclosure relates to an augmented reality device for modifying and displaying an image related to a real scene within a field of view (FOV) and an operating method of the augmented reality device. More particularly, the disclosure relates to an augmented reality device for blurring and displaying a partial area in a work space of a user and an operating method of the augmented reality device.

BACKGROUND ART

Augmented reality is a technology to overlay or superimpose a virtual image on a physical environment space of the real world or a real world object, and to display the virtual image together with the real world object. An augmented reality device (e.g., smart glasses) using augmented reality technology is efficiently used in everyday life, for example, for information search, direction guidance, and camera photographing. Especially, smart glasses, as an example of an augmented reality device, are worn as a fashion item and mainly used for outdoor activities.

An augmented reality device generally enables a user to view a scene through a see-through display arranged close to his or her eyes while the user is wearing the augmented reality device. In this case, the scene includes at least one real world object in a physical environment or a space that the user views directly with his or her eyes. The user may simultaneously view the real world object and a virtual image through the see-through display of the augmented reality device.

A user may perform a work by using various objects in a work space. When there are multiple objects within a field of view of the user in the work space, objects not directly related to the work from among the multiple objects, for example, a mobile phone or a tablet PC, may attract the user's attention through a message notification, Internet search, Internet shopping, etc. The work of the user may be disturbed due to the objects not directly related to the work within the field of view of the user, and user's concentration on the work may be reduced. In order to prevent a decrease in the user's concentration or the user's distraction due to objects not related to his/her work, a method of performing the work while wearing an augmented reality device may be considered.

SUMMARY

The disclosure provides an augmented reality device for improving work concentration and immersion of a user by blurring an area where at least one object not related to the work is located, from among a plurality of objects within a field of view of the user, and an operating method of the augmented reality device. An augmented reality device according to an embodiment of the disclosure may perform image rendering for blurring a peripheral area other than at least one object related to a work, by performing object detection, object tracking, and object segmentation by using an artificial intelligence (AI) model.

An embodiment of the disclosure provides an augmented reality device including: a camera configured to obtain a plurality of image frames of a scene; a display; a memory storing information about an object; and at least one processor, wherein the at least one processor is configured to: recognize at least one object corresponding to the information about the object from a first image frame from among the plurality of image frames obtained through the camera, obtain a mask by segmenting an area of the recognized at least one object from the first image frame, obtain a blur image in which an area other than the area of the at least one object, is blurred, the blur image being obtained by rendering using the mask, a second image frame obtained after the first image frame, and control the display to display the blur image.

In yet another embodiment, there is an operating method of an augmented reality device, the operating method including: obtaining a plurality of image frames by photographing a scene by using a camera; recognizing at least one object corresponding to information about a object from a first image frame from among the plurality of image frames; obtaining a mask, by segmenting an area of the recognized at least one object from the first image frame; obtaining a blur image in which an area other than the area of the at least one object is blurred, the blur image being obtained by rendering using the mask, a second image frame obtained after the first image frame; and displaying the blur image.

An embodiment of the disclosure provides an augmented reality device including a camera configured to obtain a plurality of image frames of a real scene, a display, a memory storing information about a preset object, and at least one processor, wherein the at least one processor is configured to recognize at least one preset object corresponding to the information about the preset object from a first image frame from among the plurality of image frames obtained through the camera, obtain a mask, by segmenting an area of the recognized at least one preset object from the first image frame, obtain a blur image in which an area other than the area of the at least one preset object is blurred, by rendering, by using the mask, a second image frame obtained after the first image frame, and control the display to display the blur image.

The at least one processor may be further configured to detect a plurality of objects from the first image frame by using an object detection model, and identify the at least one preset object from among the plurality of objects, wherein the at least one preset object is a user-defined object predefined as an object related to a work of a user.

The at least one processor may be further configured to recognize the at least one preset object from the first image frame, by tracking at least one object recognized in an image frame prior to the first image frame by using an object tracking algorithm.

The augmented reality device may further include a user input interface configured to receive a user input that selects an important object from among the recognized at least one preset object, wherein the at least one processor is further configured to obtain the mask by segmenting, from the first image frame, an area corresponding to the important object selected based on the user input received through the user input interface.

The at least one processor may be further configured to blur a peripheral area other than an area corresponding to the at least one preset object from among entire area of the second image frame, by performing convolution of the second image frame and the mask.

The at least one processor may be further configured to obtain the blur image, by performing image rendering only during a preset working time, and display the blur image on the display only during the preset working time.

The at least one processor may be further configured to synthesize the blurred area with a different color according to a work type or a work environment.

The at least one processor may be further configured to synthesize the blurred area with a virtual object or a graphical user interface (GUI) that provides information related to a work.

The augmented reality device may further include a user input interface configured to receive a user input that determines a blur option including at least one of a blur degree, a color, or a brightness of the blurred area, wherein the at least one processor is further configured to perform image rendering for blurring the area based on the blur option determined by the user input received through the user input interface.

The augmented reality device may further include a user input interface configured to receive a user input that selects at least one object from among a plurality of objects recognized from the first image frame, wherein the at least one processor is further configured to perform image rendering for blurring the at least one object selected by the user input received through the user input interface.

Another embodiment of the disclosure provides an operating method of an augmented reality device. The operating method includes obtaining a plurality of image frames by photographing a real scene by using a camera, recognizing at least one preset object corresponding to information about a preset object from a first image frame from among the plurality of image frames, obtaining a mask, by segmenting an area of the recognized at least one preset object from the first image frame, obtaining a blur image in which an area other than the area of the at least one preset object is blurred, by rendering, by using the mask, a second image frame obtained after the first image frame, and displaying the blur image.

The recognizing of the at least one preset object may include detecting a plurality of objects from the first image frame by using an object detection model, and identifying the at least one preset object from among the plurality of objects, wherein the at least one preset object is a user-defined object pre-defined as an object related to a work of a user.

The obtaining of the mask may include selecting an important object from among the recognized at least one preset object, based on a user input, and obtaining the mask, by segmenting an area corresponding to the selected important area from the first image frame.

The obtaining of the blur image may include blurring a peripheral area other than an area corresponding to the at least one preset object from among entire area of the second image frame, by performing convolution of the second image frame and the mask.

The obtaining of the blur image may include obtaining the blur image, by performing image rendering only during a preset working time, and the displaying of the blur image may include displaying the blur image only during the preset working time.

The obtaining of the blur image may include synthesizing the blurred area with a different color according to a work type or a work environment.

The obtaining of the blur image may include synthesizing the blurred area with a virtual object or a graphical user interface (GUI) that provides information related to a work.

The obtaining of the blur image may include determining a blur option including at least one of a blur degree, a color, or a brightness based on a user input, and performing image rendering for blurring the area based on the blur operation determined by the user input.

The operating method may further include selecting at least one object from among a plurality of objects recognized from the first image frame based on a user input, wherein the obtaining of the blur image includes performing image rendering for blurring the at least one object selected by the user input.

Another embodiment of the disclosure provides a computer-readable recording medium having recorded thereon a program for executing the operating method, on a computer.

BRIEF DESCRIPTION OF DRAWINGS

The disclosure may be readily understood from the following detailed description in conjunction with the accompanying drawings, and reference numerals denote structural elements.

DETAILED DESCRIPTION

Figure 1:
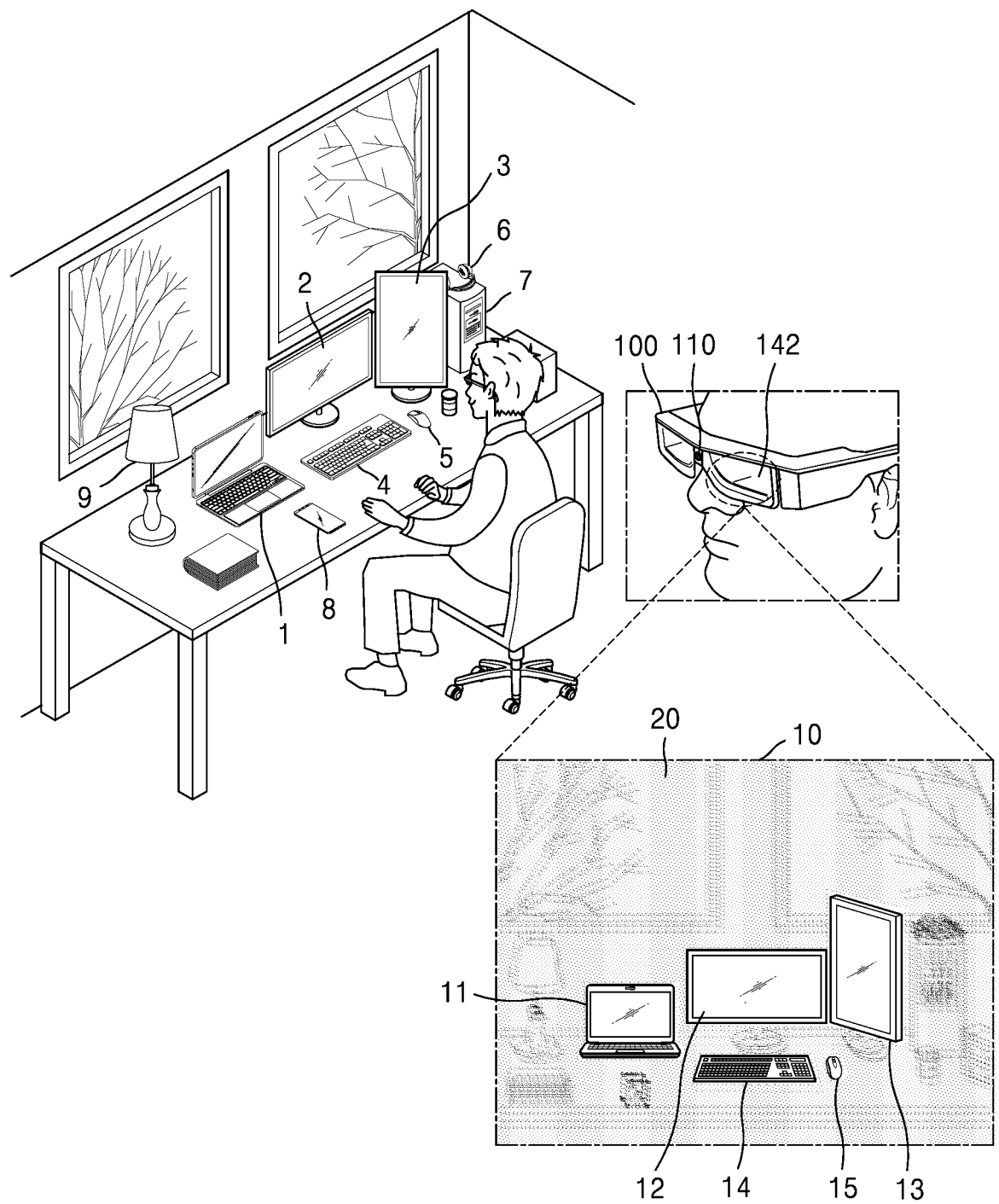
FIG. 1 is a conceptual view illustrating an operation by which an augmented reality device displays a blur image of a real scene, according to an embodiment of the disclosure.

Throughout the disclosure, the expression "at least one of a, b or c" indicates only a, only b, only c, both a and b, both a and c, both b and c, all of a, b, and c, or variations thereof.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

When a part "includes" or "comprises" an element, unless there is a particular description contrary thereto, the part may further include other elements, not excluding the other elements. The term used in the embodiments such as "unit" or "module" indicates a unit for processing at least one function or operation, and may be implemented in hardware, software, or in a combination of hardware and software.

The expression "configured (or set) to" used in the specification may be replaced with, for example, "suitable for," "having the capacity to," "designed to," "adapted to," "made to," or "capable of" according to a situation. The term "configured to (or set)" does not always mean only "specifically designed to" by hardware. Alternatively, in some situation, the expression "system configured to" may mean that the system is "capable of" operating together with another apparatus or component. For example, "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

When a component is referred to as being "connected" or "accessed" to or by any other component, it should be understood that the component may be directly connected or accessed to or by the other component, but another new component may also be interposed between them, unless otherwise specifically indicated.

In the disclosure, 'augmented reality' means showing a virtual image in a physical environment space of the real world or showing a real world object and a virtual image together.

Also, an 'augmented reality device' may be a device capable of representing 'augmented reality', and may include, as well as augmented reality glasses being in the form of glasses that a user wears generally on his/her face, a head mounted display (HMD) apparatus that is mounted on a head, an augmented reality helmet, etc. However, the disclosure is not limited thereto, and the augmented reality device may be implemented as one of various electronic devices such as a mobile device, a smartphone, a laptop computer, a desktop computer, a tablet PC, an e-book terminal, a digital broadcasting terminal, a personal digital assistant (PDA), a portable multimedia player (PMP), a navigation device, an MP3 player, a camcorder, an Internet protocol television (IPTV), a digital television (DTV), or a wearable device.

Moreover, a 'real scene' may be a real world scene that a user views via an augmented reality device and may include real world object(s).

In the disclosure, a 'virtual image' may be an image generated through an optical engine and may include both a still image and a video. The virtual image may be shown together with a real scene and may be a virtual image representing information about a real world object in the real scene or information about an operation of an augmented reality device.

In the disclosure, a 'virtual object' refers to a partial region of a virtual image. The virtual object may indicate information related to a real world object. The virtual object may include, for example, at least one of letters, numbers, symbols, icons, images, or animations.

The disclosure will now be described more fully with reference to the accompanying drawings for one of ordinary skill in the art to be able to perform the disclosure without any difficulty. However, the disclosure may be embodied in many different forms and is not limited to the embodiments of the disclosure set forth herein.

Hereinafter, embodiments of the disclosure will be described in detail with reference to the drawings.

FIG. 1 is a conceptual view illustrating an operation by which an augmented reality device 100 displays a blur image of a real scene, i.e., a scene, according to an embodiment of the disclosure.

Referring to FIG. 1, the augmented reality device 100 may include a camera 110 and a glasses lens 142. The augmented reality device 100 may obtain time-sequential image frames of the real scene by photographing images of a real scene. In an embodiment of the disclosure, the real scene may be a work space where a user performs a work, but is not limited to. A plurality of real world objects 1 through 9 may be arranged in the work space. The plurality of real world objects 1 through 9 may include at least one preset object, i.e., at least one object. In an embodiment of the disclosure, the preset object may be a user-defined object. In the disclosure, the 'user-defined object' refers to an object pre-defined or determined as an object related to the work of the user. At least one user-defined object may be provided. The user-defined object may be defined by the user's selection. Examples of the at least one user-defined object may include, but are not limited to, a laptop PC, a computer monitor, a keyboard, and a mouse. In an embodiment of FIG. 1, the real world objects 1 through 9 include a laptop PC 1, computer monitors 2 and 3, a keyboard 4, and a mouse 5 which may be user-defined objects pre-defined by the user. Information about an image of the user-defined object may be stored in a memory 130 (see FIG. 2) of the augmented reality device 100.

The augmented reality device 100 may recognize a plurality of objects from a plurality of image frames. In an embodiment of the disclosure, the augmented reality device 100 may detect the plurality of objects from the plurality of image frames by using an object detection model. The object detection model may include, but is not limited to, a convolutional neural network. The augmented reality device 100 may identify at least one user-defined object 11, 12, 13, 14, and 15 from among the plurality of objects detected from the plurality of image frames.

The augmented reality device 100 may segment an area corresponding to the at least one user-defined object 11, 12, 13, 14, and 15 identified from the plurality of image frames. In an embodiment of the disclosure, the augmented reality device 100 may segment the area corresponding to the at least one user-defined object 11, 12, 13, 14, and 15 from the plurality of image frames, by using an object segmentation model including a convolutional neural network model. The augmented reality device 100 may obtain a mask, by using an image frame in which the area corresponding to the at least one user-defined object 11, 12, 13, 14, and 15 is removed according to a segmentation result.

The augmented reality device 100 may obtain a blur image 10, by rendering the plurality of image frames by using the mask. The blur image 10 may be an image in which a peripheral area 20 other than the area corresponding to the at least one user-defined object 11, 12, 13, 14, and 15 is blurred.

The augmented reality device 100 may display the blur image 10 through the glasses lens 142. In an embodiment of the disclosure, the glasses lens 142 may be formed of a transparent material, and may be implemented as a see-through display capable of viewing the blur image 10 as well as the plurality of real world objects 1 through 9 in the work space. In an embodiment of the disclosure, the glasses lens 142 may output the blur image 10 projected by a display engine 144 (see FIG. 2) to the user, and the user may view the blur image 10 through the glasses lens 142.

When there is plurality of objects within a field of view of the user in the work space, objects not directly related to the work from among the plurality of real world objects 1 through 9, for example, a headset 6, a mobile phone 8, and a lamp 9, may attract the user's attention and may reduce concentration. Also, when the mobile phone 8 or a tablet PC is located in the work space, the user's attention may be attracted through message notification, Internet search, Internet shopping, etc. and the work of the user may be disturbed or the user may be distracted.

Because the augmented reality device 100 according to an embodiment of the disclosure recognizes the at least one user-defined object 11, 12, 13, 14, and 15 pre-defined as an object related to the work from the plurality of image frames obtained by photographing the work space through the camera 110, and displays, to the user, the blur image 10 in which the peripheral area 20 other than the area corresponding to the recognized at least one user-defined object 11, 12, 13, 14, and 15 is blurred, concentration of the user on the work may be improved. Also, the augmented reality device 100 according to an embodiment of the disclosure may provide a special visual environment and user experience (UX) related to the work through the blur image 10.

Figure 2:
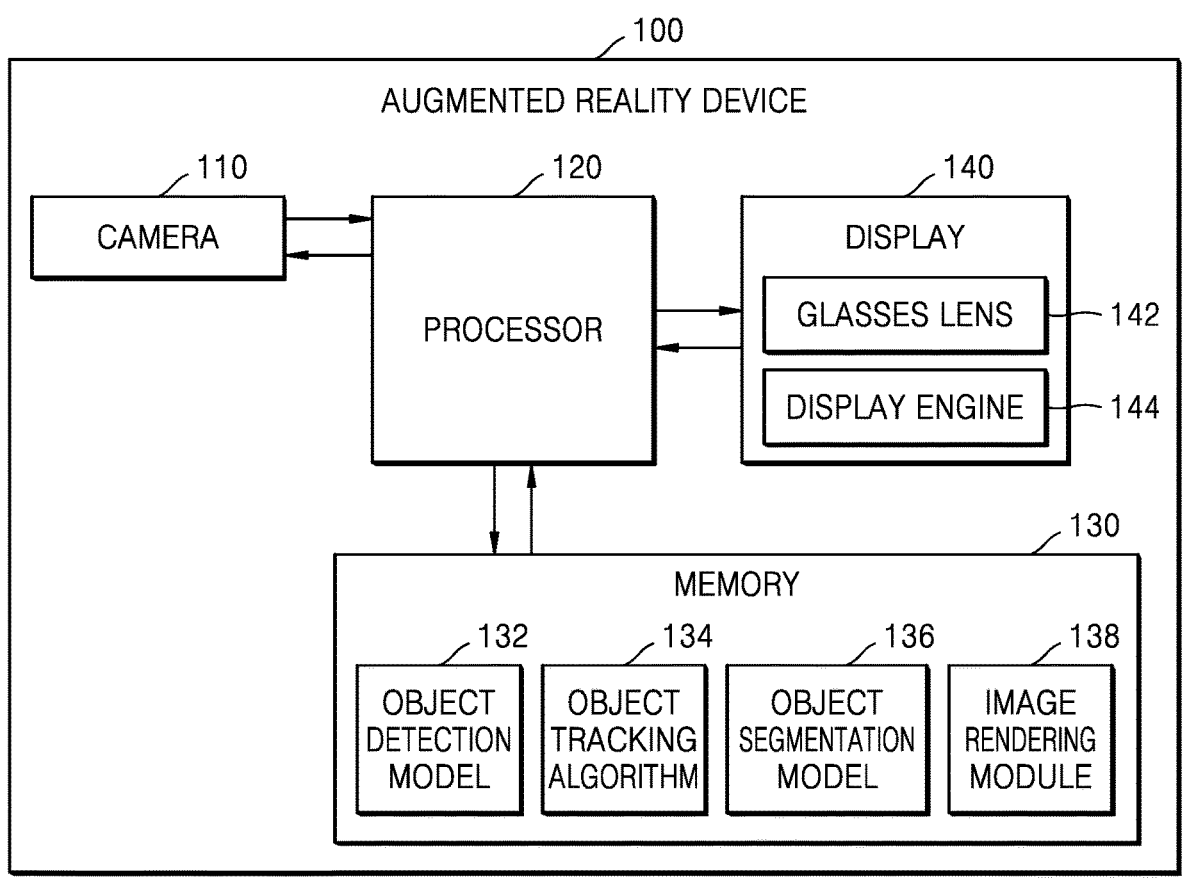
FIG. 2 is a block diagram illustrating elements of an augmented reality device, according to an embodiment of the disclosure.

FIG. 2 is a block diagram illustrating elements of the augmented reality device 100, according to an embodiment of the disclosure.

Referring to FIG. 2, the augmented reality device 100 may include the camera 110, a processor 120, the memory 130, and a display 140. The camera 110, the processor 120, the memory 130, and the display 140 may be electrically and/or physically connected to one another.

The elements illustrated in FIG. 2 are an example, and elements included in the augmented reality device 100 are not limited to those illustrated in FIG. 2. The augmented reality device 100 may not include some of the elements illustrated in FIG. 2, or may further include elements not illustrated in FIG. 2. For example, the augmented reality device 100 may further include a battery for supplying driving power to the camera 110, the processor 120, the memory 130, and the display 140. Alternatively, the augmented reality device 100 may further include a gaze tracking sensor for obtaining data about a gaze direction of a user. Alternatively, the augmented reality device 100 may further include a hand tracking sensor for identifying the user's palm or finger from an image frame and recognizing an area or a point indicated by the hand.

The camera 110 is configured to photograph a real scene, for example, a work space, and obtain an image frame. In an embodiment of the disclosure, the camera 110 may obtain a sequence of image frames as time passes. The camera 110 may include a lens and an image sensor. When the user wears the augmented reality device 100, the lens may be located in a direction toward the real scene, instead of the user's face. The image sensor may obtain a plurality of image frames by receiving light reflected by a real world object of the real scene through the lens, converting a luminance or intensity of the received light into an electrical signal, and imaging the electrical signal.

The camera 110 provides data of the plurality of image frames to the processor 120.

The processor 120 may execute one or more instructions or program code stored in the memory 130, and may perform a function and/or an operation corresponding to the instructions or the program code. The processor 120 may include a hardware component for performing arithmetic, logic, and input/output operations and signal processing. The processor 120 may include at least one of, for example, but not limited to, a central processing unit, a microprocessor, a graphics processing unit, an application processor (AP), an application-specific integrated circuit (ASIC), a digital signal processor (DSP), a digital signal processing device (DSPD), a programmable logic device (PLD), or a field-programmable gate array (FPGA).

Although the processor 120 is one element in FIG. 2, the disclosure is not limited thereto. In an embodiment of the disclosure, one or more processors instead of the processor 120 may be provided. In yet another embodiment, the processor 120 includes a plurality of processors.

In an embodiment of the disclosure, the processor 120 may be a dedicated hardware chip for performing artificial intelligence (AI) learning.

Instructions and program code readable by the processor 120 may be stored in the memory 130. The memory 130 may include at least one of, for example, a flash memory type, a hard disk type, a solid state drive (SSD), a multimedia card micro type, a card-type memory (e.g., SD or XD memory), a random-access memory (RAM), a static random-access memory (SRAM), a read-only memory (ROM), an electrically erasable programmable read-only memory (EEPROM), a programmable read-only memory (PROM), a mask ROM, or a flash ROM.

Instructions or program code for performing functions or operations of the augmented reality device 100 may be stored in the memory 130. In an embodiment of the disclosure, at least one of instructions, an algorithm, a data structure, program code, or an application program readable by the processor 120 may be stored in the memory 130. The instructions, model, algorithm, data structure, and program code stored in the memory 130 may be implemented in a programming or scripting language such as C, C++, Java, or assembler.

Instructions, an algorithm, a data structure, or program code related to an object detection model 132, an object tracking algorithm 134, an object segmentation model 136, and an image rendering module 138 may be stored in the memory 130. A 'model' or 'module' included in the memory 130 refers to a unit for processing a function or an operation performed by the processor 120, and may be implemented as software such as instructions, an algorithm, a data structure, or program code.

In the following embodiment of the disclosure, the processor 120 may be implemented by executing the instructions or program code stored in the memory 130.

The object detection model 132 includes instructions or program code related to an operation and/or a function of recognizing an object from an image frame. In an embodiment of the disclosure, the object detection model 132 may be an artificial neural network model. The object detection model 132 may be a deep neural network model trained to detect an object through supervised learning by applying a bounding box image detectable as an object from tens of thousands or hundreds of millions of input images as input data and a label value for an object detection result as an output ground truth. The object detection model 132 may be implemented as, for example, region-based convolutional neural network (R-CNN), faster region-based convolutional neural network (Faster R-CNN), single shot multibox detector (SSD), YOLO v4, CenterNet, or MobileNet. However, the object detection model 132 of the disclosure is not limited to the above deep neural network model.

The processor 120 may detect a plurality of objects from a plurality of image frames, by executing instructions or program code related to the object detection model 132. In an embodiment of the disclosure, the processor 120 may detect the plurality of objects from a first image frame from among the plurality of image frames by using the object detection model 132, and may identify at least one preset object from among the plurality of objects. The processor 120 may identify the at least one preset object from among the plurality of objects detected from the first image frame, based on information about a preset object. The information about the preset object may be pre-stored in the memory 130. In an embodiment of the disclosure, the preset object may be a user-defined object. The 'user-defined object' refers to an object pre-defined or determined as an object related to a work of a user. The user-defined object may be defined by the user's selection. Information about the user-defined object may be pre-stored in the memory 130. The processor 120 may identify at least one user-defined object from among the plurality of objects by comparing the plurality of objects detected from the first image frame with an image of the user-defined object pre-stored in the memory 130. In an embodiment of the disclosure, the processor 120 may identify the at least one user-defined object from the plurality of objects by using instance recognition. A specific embodiment where the processor 120 recognizes the at least one user-defined object from the first image frame by using the object detection model 132 will be described in detail with reference to FIGS. 5 and 6.

The object tracking algorithm 134 includes instructions or program code related to image processing for tracking a position change in an object recognized from a plurality of image frames. The object tracking algorithm 134 may track a change in an object by using feature information such as a size, a shape, an outline, or a color of the object in the plurality of image frames. In an embodiment of the disclosure, the processor 120 may track at least one object recognized in an image frame prior to a first image frame from among the plurality of image frames by executing instructions or program code related to the object tracking algorithm 134, and may recognize at least one user-defined object from the first image frame. The processor 120 may track a position change in the at least one user-defined object from the first image frame by using the object tracking algorithm 134.

The object segmentation model 136 includes instructions or program code related to an operation and/or a function of segmenting an object area from an image. In an embodiment of the disclosure, the object segmentation model 136 may include a deep neural network model. In an embodiment of the disclosure, the object segmentation model 136 may be implemented as a convolutional neural network object segmentation model. However, the disclosure is not limited thereto, and the object segmentation model 136 may be implemented as, for example, region-based convolutional neural network (R-CNN), faster region-based convolutional neural network (Fast R-CNN), single shot multibox detector (SSD), YOLO v4, CenterNet, or MobileNet. Although the object segmentation model 136 is a neural network model separate from the object detection model 132 in FIG. 2, the disclosure is not limited thereto. In another embodiment of the disclosure, the object segmentation model 136 and the object detection model 132 may be integrated into one neural network model.

In an embodiment of the disclosure, the processor 120 may segment an area corresponding to at least one user-defined object from a first image frame, by executing instructions or program code related to the object segmentation model 136. The processor 120 may obtain an image frame in which the area corresponding to the at least one user-defined object is removed according to a segmentation result. The processor 120 may obtain a mask by using the obtained image frame. The 'mask' refers to an image for masking, modifying, or editing a specific portion of the image frame.

In an embodiment of the disclosure, the augmented reality device 100 may further include a user input interface for receiving a user input selecting an important object from among the at least one user-defined object. The user input interface may be, for example, a hand tracking sensor for recognizing an area or an object indicated by a user's palm or finger. In this case, the processor 120 may recognize an object indicated by the user's finger from among the at least one user-defined object by using the hand tracking sensor, and may select the recognized object as an important object. However, the disclosure is not limited thereto, and the user input interface may include a gaze tracking sensor for obtaining coordinate information of a gaze point at which the user gazes with both eyes, by obtaining information about a gaze direction of the user's both eyes. In this case, the processor 120 may recognize an object on which the gaze point stays for a preset period of time or more from among the at least one user-defined object as an important object. The processor 120 may obtain a mask by segmenting the important object selected by a user input from the first image frame.

The image rendering module 138 includes instructions or program code related to an operation and/or a function of generating a blur image, by rendering a plurality of image frames by using a mask. The image rendering module 138 may blur an image by using image blurring or image smoothing technology. The image rendering module 138 may perform image blurring by using at least one of, for example, average blurring, Gaussian blurring, median blurring, or bilateral filter. However, the disclosure is not limited thereto, and the image rendering module 138 may perform image blurring by using any known blurring technology.

The processor 120 may synthesize a second image frame obtained after a first image frame with a mask by executing instructions or program code related to the image rendering module 138, and may obtain a blur image in which a peripheral area other than an area corresponding to the at least one user-defined object from among entire area of the second image frame is blurred. In an embodiment of the disclosure, the processor 120 may blur the peripheral area other than the area corresponding to the at least one user-defined object from among all of the areas of the second image frame, by performing convolution of the second image frame and the mask. A specific embodiment where the processor 120 segments the area corresponding to the at least one user-defined object from the first image frame by using the object segmentation model 136 and obtains the blur image by using the image rendering module 138 will be described in detail with reference to FIGS. 7 and 8.

In an embodiment of the disclosure, the augmented reality device 100 may further include a user input interface for receiving a user input determining a blur option including at least one of a blur degree, a color, or a brightness about a peripheral area. The processor 120 may determine the blur option including at least one of the blur degree, the color, or the brightness based on a user input received through the user input interface, and may blur the peripheral area from among entire area of a second image frame based on the determined blur option.

In an embodiment of the disclosure, the processor 120 may obtain a blur image, by performing image rendering only during a working time. The working time may be preset by a user. For example, the working time may be set to 45 minutes, and a rest time may be set to 15 minutes. The processor 120 may display the blur image on the display 140 only during the working time. A specific embodiment where the processor 120 obtains the blur image only during the working time and displays the blur image will be described in detail with reference to FIG. 9.

In an embodiment of the disclosure, the processor 120 may obtain a blur image, by synthesizing a peripheral area that is blurred from among all images of a second image frame with a different color. The processor 120 may synthesize a peripheral area with a different color according to a work type or a work environment. A specific embodiment where the processor 120 obtains the blur image by synthesizing the peripheral area with the different color according to the type of the work and the work environment will be described in detail with reference to FIG. 10.

In an embodiment of the disclosure, the processor 120 may obtain a blur image by synthesizing a peripheral area that is blurred from among entire area of a second image frame with a virtual image related to a work. The virtual image synthesized with the peripheral area may be a virtual object or a graphical user interface (GUI) that provides information related to the work. A specific embodiment where the processor 120 obtains the blur image by synthesizing the peripheral area with the virtual object or the graphical UI will be described in detail with reference to FIG. 11.

In an embodiment of the disclosure, the augmented reality device 100 may further include a user input interface for receiving a user input that selects at least one object from among a plurality of objects recognized from an image. The processor 120 may select at least one object from among the plurality of objects recognized from a first image frame based on a user input received through the user input interface, and may obtain a blur image by blurring the selected at least one object. A specific embodiment where the processor 120 obtains the blur image by blurring the at least one object selected by the user input will be described in detail with reference to FIGS. 13 and 14.

The processor 120 may display a blur image on the display 140 to a user.

The display 140 may include the glasses lens 142 and the display engine 144.

The glasses lens 142 may be formed of a transparent material, and may be implemented as a see-through display capable of viewing the blur image projected by the display engine 144 as well as a real world object in a work space. In an embodiment of the disclosure, the glasses lens 142 may include a waveguide through which light of the blur image projected from the display engine 144 is received, light is transmitted, and an optical path is changed.

The display engine 144 is configured to project the blur image to the waveguide of the glasses lens 142. The display engine 144 may perform a function of a projector. The display engine 144 may further include an illumination optical system, an optical path converter, an image panel, a beam splitter, and a projection optical system. In an embodiment of the disclosure, the display engine 144 may obtain image data of the blur image, may generate a virtual image based on the obtained image data, and may project the virtual image to the waveguide through an emission surface along with light output from a light source. In this case, the processor 120 may provide image data including RGB color and luminance values of a plurality of pixels constituting the virtual image to the display engine 144. The display engine 144 may perform image processing by using the RGB color and luminance values of the plurality of pixels, and may project the virtual image to the waveguide by controlling the light source.

Figure 3:
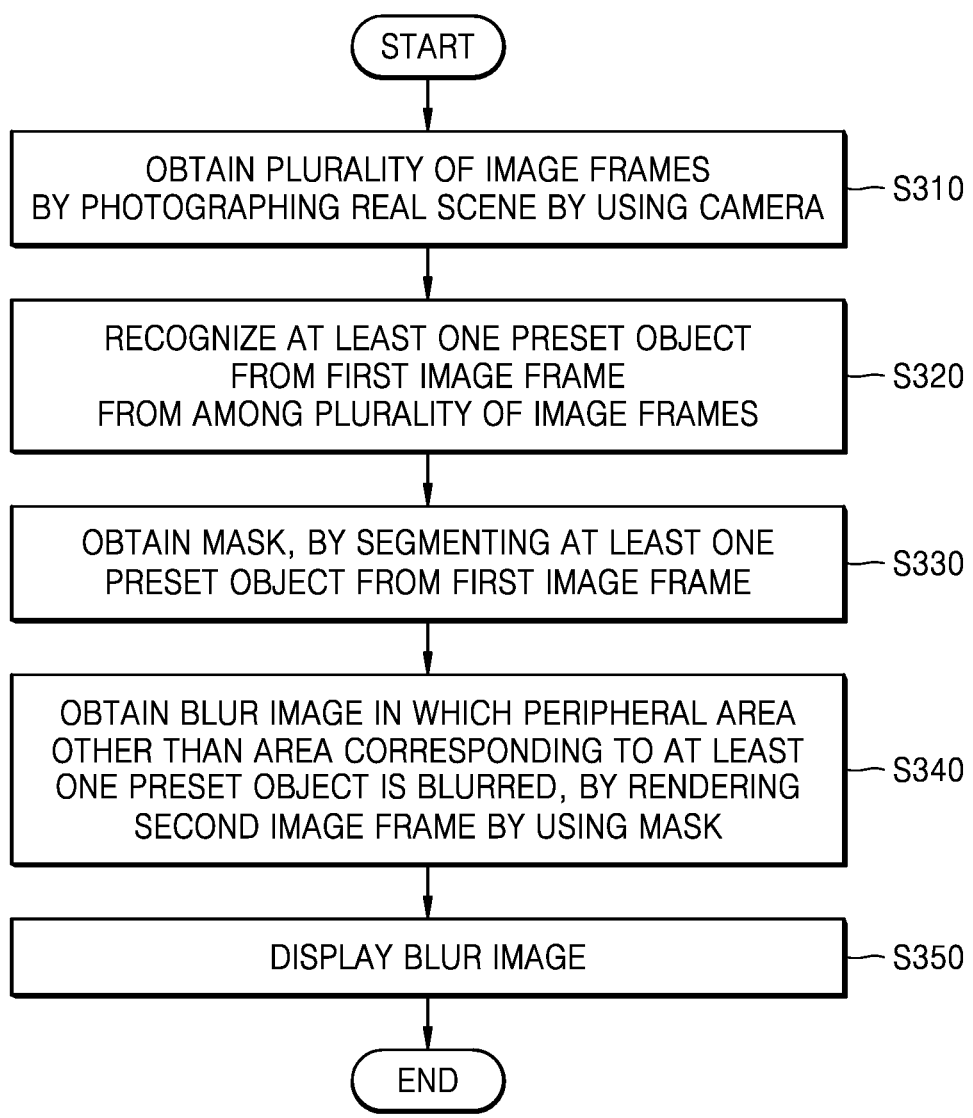
FIG. 3 is a flowchart illustrating an operating method of an augmented reality device, according to an embodiment of the disclosure.

FIG. 3 is a flowchart illustrating an operating method of the augmented reality device 100, according to an embodiment of the disclosure.

Figure 4:
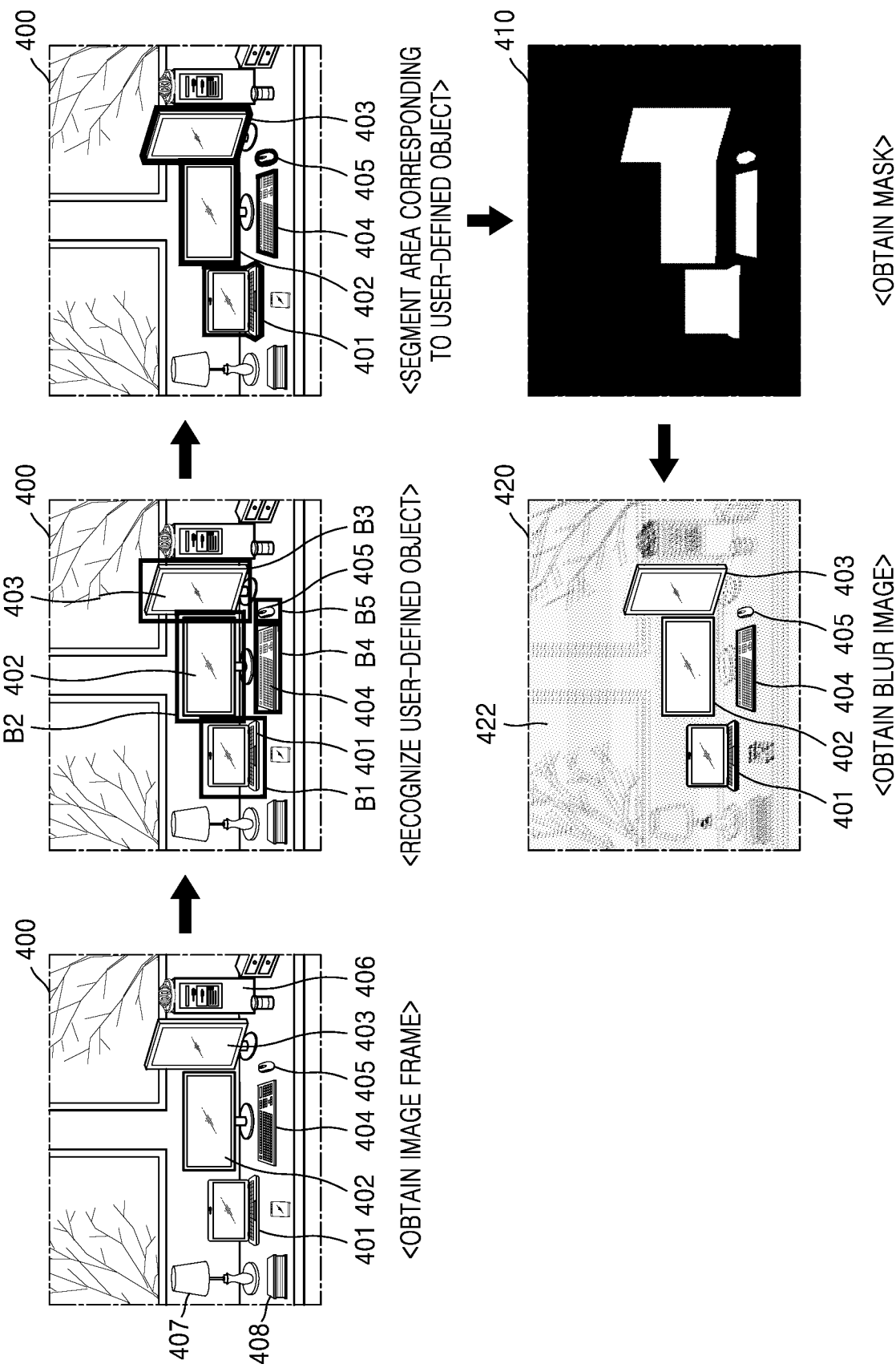
FIG. 4 is a view illustrating an operation by which an augmented reality device obtains a blur image, according to an embodiment of the disclosure.

FIG. 4 is a view illustrating an operation by which the augmented reality device 100 obtains a blur image 420, according to an embodiment of the disclosure.

An operation by which the augmented reality device 100 obtains the blur image 440 will be described with reference to FIGS. 3 and 4.

Referring to FIG. 3, in operation S310, the augmented reality device 100 obtains a plurality of image frames by photographing a real scene by using a camera. The real scene may be, for example, a work space where a user performs a work. However, the disclosure is not limited thereto. In an embodiment of the disclosure, the augmented reality device 100 may sequentially obtain the plurality of image frames over time by using the camera.

Referring to FIG. 4 together, the augmented reality device 100 may obtain a first image frame 400 from among the plurality of image frames. The first image frame 400 may include a plurality of objects 401 through 408.

Referring to operation S320 of FIG. 3, the augmented reality device 100 detects at least one preset object from the first image frame from among the plurality of image frames. Referring to FIG. 4 together, the augmented reality device 100 may detect the plurality of objects 401 through 408 from the first image frame 400 by using the object detection model 132 (see FIG. 2). The object detection model 132 may be implemented as, for example, region-based convolutional neural network (R-CNN), faster region-based convolutional neural network (Faster R-CNN), single shot multibox detector (SSD), YOLO v4, CenterNet, or MobileNet. However, the object detection model 132 of the disclosure is not limited to the above deep neural network model.

The augmented reality device 100 may identify the at least one preset object from among the plurality of objects 401 through 409 detected from the first image frame 400 by using the object detection model 132. The augmented reality device 100 may identify the at least one preset object from among the plurality of objects 401 through 409 by using information about preset objects stored in the memory 130 (see FIG. 2). In an embodiment of the disclosure, the preset objects may be user-defined objects 401, 402, 403, 404, and 405. In the disclosure, the 'user-defined objects 401, 402, 403, 404, and 405' refer to objects pre-defined or determined as objects related to the work of the user. The user-defined objects may be defined by the user's selection. Information about the user-defined objects 401, 402, 403, 404, and 405 and images of the user-defined objects 401, 402, 403, 404, and 405 may be pre-stored in the memory 130 (see FIG. 2). The augmented reality device 100 may identify the at least one user-defined object 401, 402, 403, 404, and 405 from among the plurality of objects 401 through 409, by comparing the plurality of objects 401 through 409 detected from the first image frame 400 with images of the user-defined objects pre-stored in the memory 130. In an embodiment of the disclosure, the augmented reality device 100 may identify the at least one user-defined object 401, 402, 403, 404, and 405 from the plurality of objects 401 through 409 by using instance recognition.

Although the user-defined objects 401, 402, 403, 404, and 405 are a laptop PC 401, computer monitors 402 and 403, a keyboard 404, and a mouse 405 in an embodiment of FIG. 4, the disclosure is not limited thereto. Also, although the number of user-defined objects 401, 402, 403, 404, and 405 is 5 in FIG. 4, this is merely an example and the disclosure is not limited thereto. In an embodiment of the disclosure, one or more user-defined objects 401, 402, 403, 404, and 405 may be provided.

The augmented reality device 100 may display bounding boxes B1, B2, B3, B4, and B5 surrounding the user-defined objects 401, 402, 403, 404, and 405 to specify the identified user-defined objects 401, 402, 403, 404, and 405.

Referring to operation S330 of FIG. 3, the augmented reality device 100 obtains a mask, by segmenting the at least one preset object from the first image frame. Referring to FIG. 4 together, the augmented reality device 100 may specify the at least one user-defined object 401, 402, 403, 404, and 405 in the bounding boxes B1, B2, B3, B4, and B5 in the first image frame 400 by using the object segmentation model 136 (see FIG. 2). The augmented reality device 100 may identify a shape of the at least one user-defined object 401, 402, 403, 404, and 405 by detecting an outline and a boundary line of the at least one user-defined object 401, 402, 403, 404, and 405, and may segment and remove, from the first image frame 400, an area corresponding to the identified at least one user-defined object 401, 402, 403, 404, and 405. The augmented reality device 100 may obtain an image frame in which the area corresponding to the at least one user-defined object 401, 402, 403, 404, and 405 is removed from the first image frame 400 according to a segmentation result. The augmented reality device 100 may a mask 410 for separating a peripheral area from the area corresponding to the at least one user-defined object 401, 402, 403, 404, and 405 by using the obtained image frame.

Referring to operation S340 of FIG. 3, the augmented reality device 100 obtains a blur image in which the peripheral area other than the at least one user-defined object is blurred, by rendering a second image frame by using the mask. Referring to FIG. 4 together, the augmented reality device 100 may synthesize the second image frame obtained after the first image frame 400 with the mask 410, and may obtain the blur image 420 in which a peripheral area 422 other than the area corresponding to the at least one user-defined object 401, 402, 403, 404, and 405 from among entire area of the second image frame is blurred. In an embodiment of the disclosure, the augmented reality device 100 may blur the peripheral area 422 other than the area corresponding to the at least one user-defined object from among all of the areas of the second image frame, by performing convolution of the second image frame and the mask 410.

Referring to operation S350 of FIG. 3, the augmented reality device 100 displays the blur image 4520 (see FIG. 4). The augmented reality device 100 may project the blur image 420 to a waveguide along with light output from a light source by using the display engine 144 (see FIG. 2), and may display the blur image 420 through the waveguide to the user.

Figure 5:
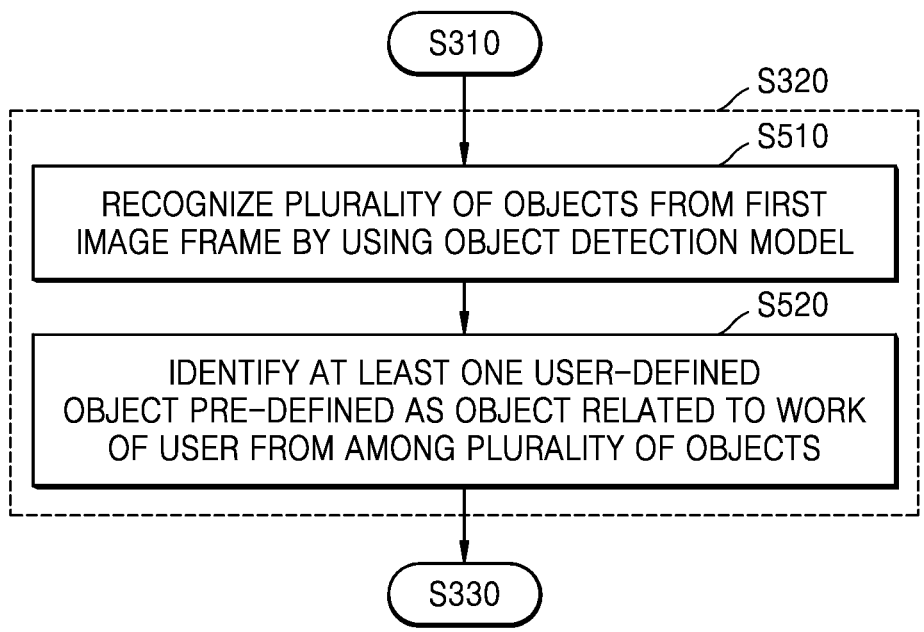
FIG. 5 is a flowchart illustrating a method by which an augmented reality device identifies a user-defined object from a first image frame, according to an embodiment of the disclosure.

FIG. 5 is a flowchart illustrating a method by which the augmented reality device 100 identifies a user-defined object from a first image frame, according to an embodiment of the disclosure.

Operations S510 and S520 illustrated in FIG. 5 are specified steps of operation S320 of FIG. 3. Operation S510 of FIG. 5 may be performed after operation S310 of FIG. 3 is performed. After operation S520 of FIG. 5 is performed, operation S330 of FIG. 3 may be performed.

Figure 6:
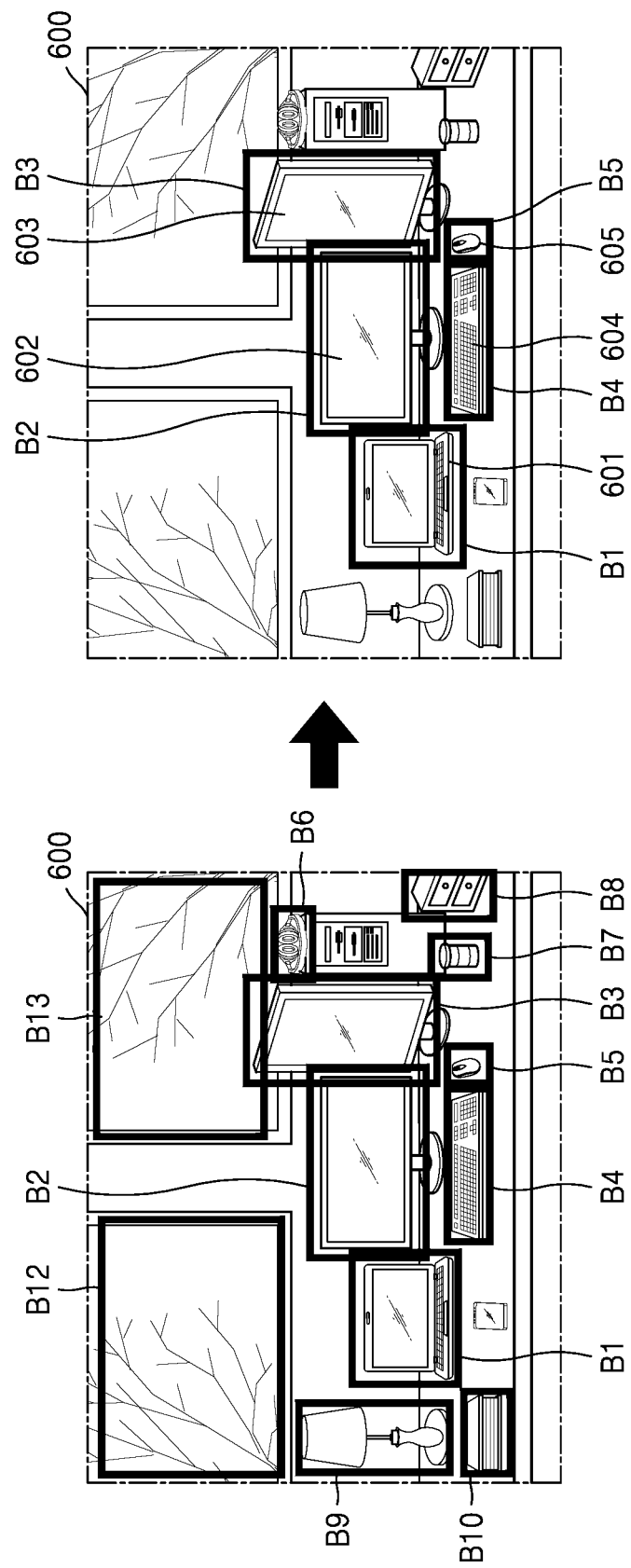
FIG. 6 is a view illustrating an operation by which an augmented reality device recognizes a user-defined object from a first image frame, according to an embodiment of the disclosure.

FIG. 6 is a view illustrating an operation by which the augmented reality device 100 recognizes user-defined objects 601, 602, 603, 604, and 605 from a first image frame 600, according to an embodiment of the disclosure.

An operation by which the augmented reality device 100 recognizes the user-defined objects 601, 602, 603, 604, and 605 from the first image frame 600 will be described with reference to FIGS. 5 and 6 together.

Referring to FIG. 5, in operation S510, the augmented reality device 100 detects a plurality of objects from a first image frame by using an object detection model. Referring to FIG. 6 together, the augmented reality device 100 may detect bounding boxes B1 through B13 in which the plurality of objects are detected from the first image frame 600, by performing inference of inputting the first image frame 600 from among a plurality of image frames obtained through the camera 110 (see FIG. 2) to the object detection model 132 (see FIG. 2). In an embodiment of the disclosure, the object detection model 132 may be a deep neural network model trained to detect an object through supervised learning by applying a bounding box image detectable as an object from tens of thousands or hundreds of millions of input images as input data and applying a label value for an object detection result as an output ground truth. The object detection model 132 may be implemented as, for example, region-based convolutional neural network (R-CNN), faster region-based convolutional neural network (Faster R-CNN), single shot multibox detector (SSD), YOLO v4, CenterNet, or MobileNet. However, the object detection model 132 of the disclosure is not limited to the above deep neural network model.

The augmented reality device 100 may input the first image frame 600 to the object detection model 132 including a pre-trained deep neural network model, and may detect the plurality of bounding boxes B1 through B13 including the plurality of objects according to an inference result through the object detection model 132. In an embodiment of the disclosure, the augmented reality device 100 may recognize the plurality of bounding boxes B1 through B13 by using a detection result from an image frame obtained prior to the first image frame 600 by using the object tracking algorithm 134 (see FIG. 2). The object tracking algorithm 134 may track a change in an object by using feature information such as a size, a shape, an outline, or a color of the object in a plurality of image frames. In an embodiment of the disclosure, the augmented reality device 100 may track at least one object recognized in the image frame prior to the first image frame 600 from among the plurality of image frames by using the object tracking algorithm 134, and may recognize the plurality of bounding boxes B1 through B13 from the first image frame 600.

Referring to operation S520 of FIG. 5, the augmented reality device 100 identifies at least one user-defined object pre-defined as an object related to a work of a user from among the plurality of objects. Referring to FIG. 6 together, the augmented reality device 100 may identify the bounding boxes B1, B2, B3, B4, and B5 including the at least one user-defined object 601, 602, 603, 604, and 605, by comparing the plurality of objects included in the recognized plurality of bounding boxes B1 through B13 with images of user-defined objects pre-stored in the memory 130 (see FIG. 2). In an embodiment of the disclosure, the augmented reality device 100 may identify the bounding boxes B1, B2, B3, B4, and B5 including the at least one user-defined object 601, 602, 603, 604, and 605 from the plurality of bounding boxes B1 through B13 by using instance recognition. In the disclosure, the 'user-defined objects 601, 602, 603, 604, and 605' refer to objects pre-defined or determined as objects related to the work of the user.

Figure 7:
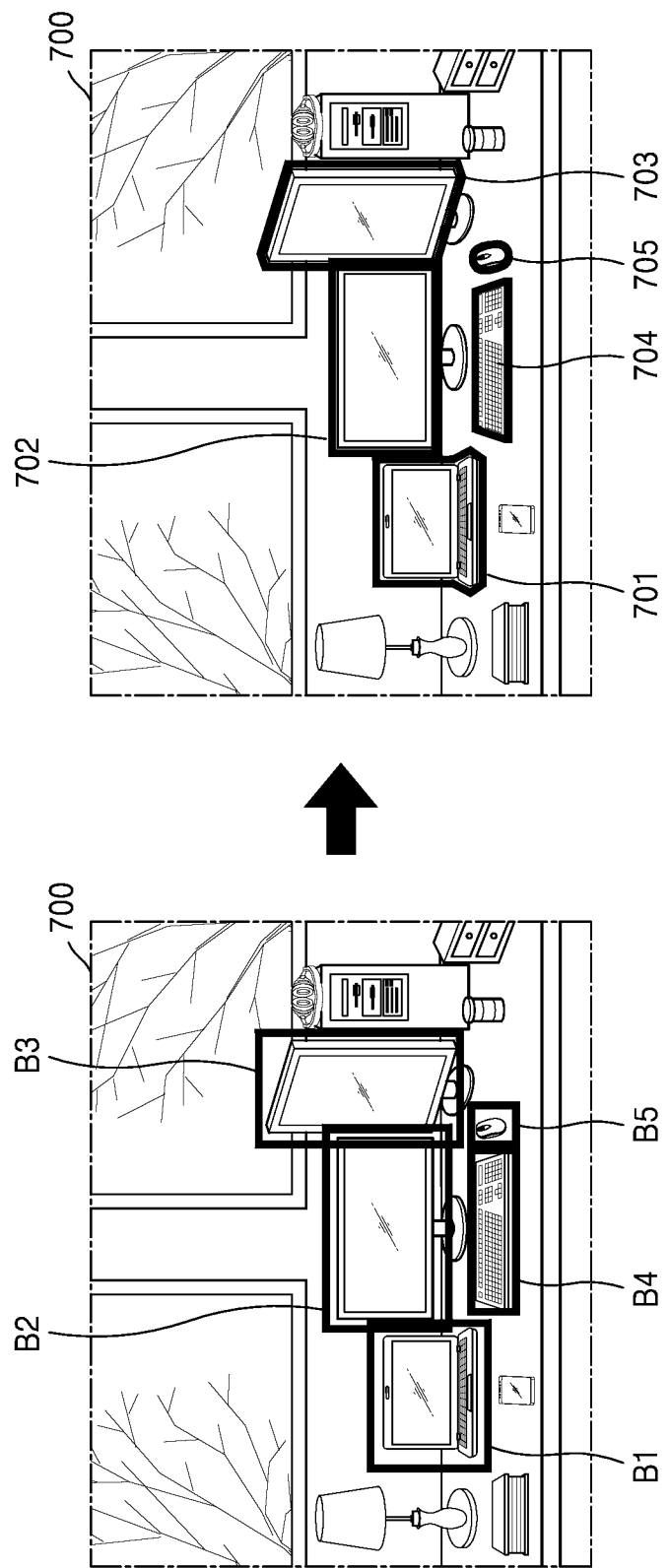
FIG. 7 is a view illustrating an operation by which an augmented reality device recognizes a user-defined object from a first image frame, according to an embodiment of the disclosure.

FIG. 7 is a view illustrating an operation by which the augmented reality device 100 recognizes user-defined objects 701, 702, 703, 704, and 705 from a first image frame 700, according to an embodiment of the disclosure.

Referring to FIG. 7, the augmented reality device 100 may accurately specify the user-defined objects 701, 702, 703, 704, and 705 in bounding boxes B1, B2, B3, B4, and B5 recognized from the first image frame 700 by using the object segmentation model 136 (see FIG. 2). The object segmentation model 136 may include a deep neural network model for segmenting an object from an image. The object segmentation model 136 may be implemented as, for example, but not limited to, a convolutional neural network object segmentation model. Alternatively, the object segmentation model 136 may be implemented as region-based convolutional neural network (R-CNN), faster region-based convolutional neural network (Faster R-CNN), single shot multibox detector (SSD), YOLO v4, CenterNet, or MobileNet.

The augmented reality device 100 may identify areas of the user-defined objects 701, 702, 703, 704, and 705 by detecting outlines and boundary lines of the user-defined objects 701, 702, 703, 704, and 705 in the bounding boxes B1, B2, B3, B4, and B5 detected from the first image frame 700 by using the object segmentation model 136. The augmented reality device 100 may segment the areas of the user-defined objects 701, 702, 703, 704, and 705 from the first image frame 700.

Figure 8:
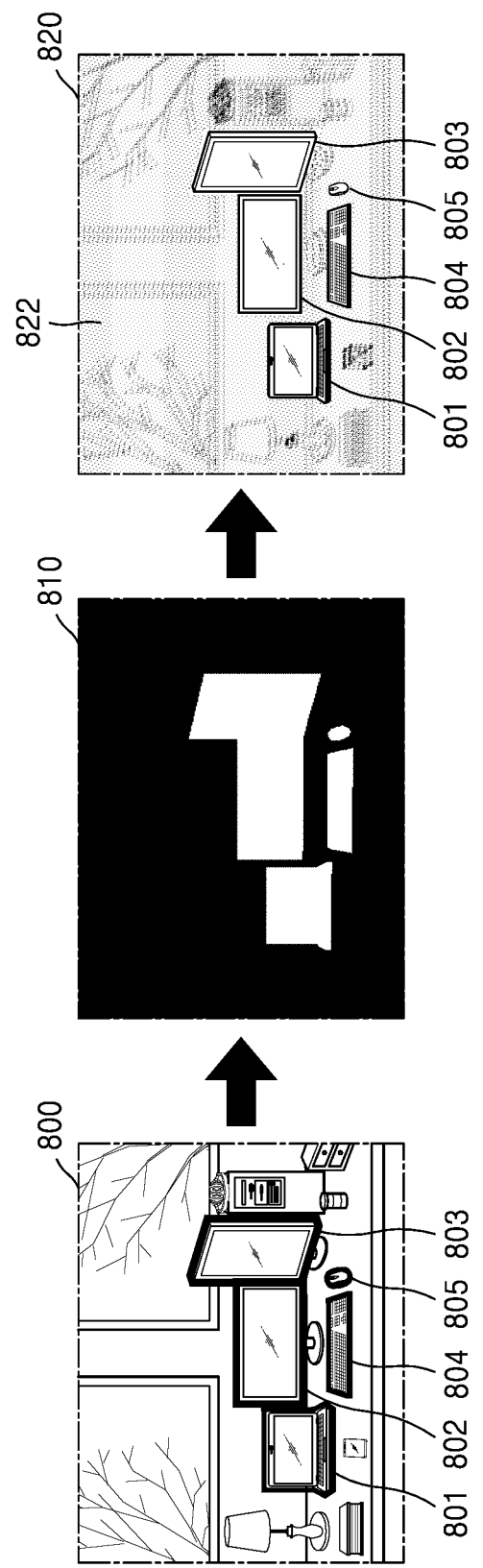
FIG. 8 is a view illustrating an operation by which an augmented reality device obtains a blur image, according to an embodiment of the disclosure.

FIG. 8 is a view illustrating an operation by which the augmented reality device 100 obtains a blur image 820, according to an embodiment of the disclosure.

Referring to FIG. 8, the augmented reality device 100 may segment and remove an area corresponding to at least one user-defined object 801, 802, 803, 804, and 805 from a first image frame 800 by using the object segmentation model 136 (see FIG. 2). The augmented reality device 100 may obtain an image frame in which the area corresponding to the at least one user-defined object 801, 802, 803, 804, and 805 is removed from the first image frame 800 according to a segmentation result. The augmented reality device 100 may obtain a mask 810 for separating the area corresponding to the at least one user-defined object 801, 802, 803, 804, and 805 from a peripheral area by using the obtained image frame.

The mask 810 may be an image for masking, modifying, or editing a specific portion of the image frame. Referring to an embodiment of FIG. 8, in the mask 810, the area corresponding to the at least one user-defined object 801, 802, 803, 804, and 805 may be processed to be transparent, and the peripheral area other than the at least one user-defined object 801, 802, 803, 804, and 805 may be processed to be black.

The augmented reality device 100 may obtain a blur image 820, by rendering a plurality of image frames by using the mask 810. In an embodiment of the disclosure, the augmented reality device 100 may synthesize a second image frame obtained after the first image frame 800 with the mask 810, and may obtain the blur image 820 in which a peripheral area 822 other than the area corresponding to the at least one user-defined object 801, 802, 803, 804, and 805 from among entire area of the second image frame is blurred. In an embodiment of the disclosure, the augmented reality device 100 may blur the peripheral area 822 other than the area corresponding to the at least one user-defined object 801, 802, 803, 804, and 805 from among all of the areas of the second image frame, by performing convolution of the second image frame and the mask 810.

In an embodiment of the disclosure, the augmented reality device 100 may blur the plurality of image frames through rendering using image blurring or image smoothing technology. The augmented reality device 100 may perform image blurring by using at least one of, for example, average blurring, Gaussian blurring, median blurring, or bilateral filter.

Figure 9:
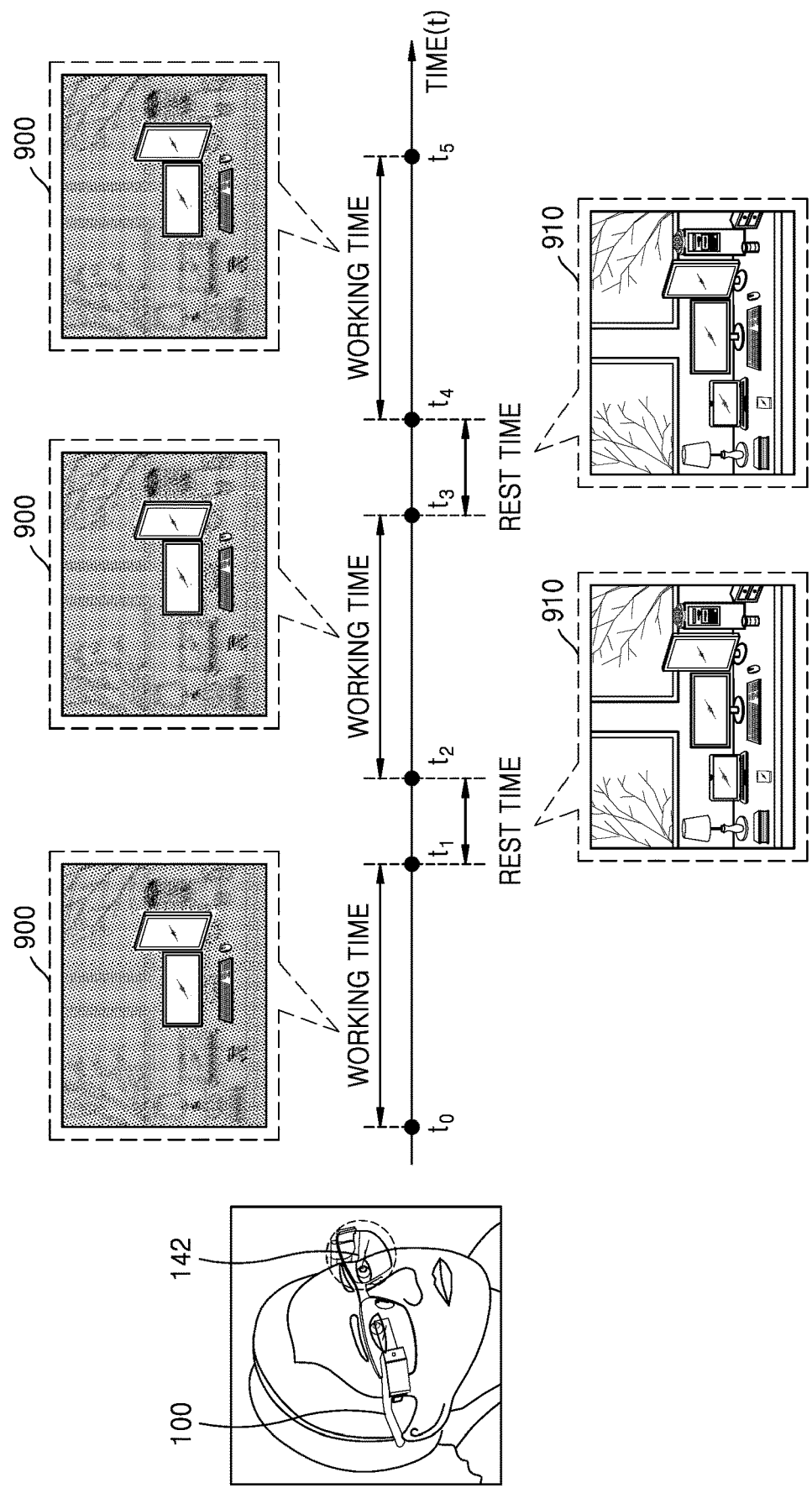
FIG. 9 is a view for describing an operation by which an augmented reality device displays different images as time passes, according to an embodiment of the disclosure.

FIG. 9 is a view for describing an operation by which the augmented reality device 100 displays different images as time passes, according to an embodiment of the disclosure.

Referring to FIG. 9, the augmented reality device 100 may display different images over time through the glasses lens 142. In an embodiment of the disclosure, the augmented reality device 100 may display a blur image 900 in which a peripheral area other than at least one user-defined object is blurred, by performing image rendering only during a working time. The 'working time' refers to a time preset for a user to perform a work. The working time may be determined by a user input. The working time may be determined to be, for example, but not limited to, 45 minutes.

Referring to an embodiment of FIG. 9, the processor 120 (see FIG. 2) of the augmented reality device 100 may obtain the blur image 900 in which the peripheral area other than an area corresponding to the at least one user-defined object is blurred by rendering an image frame during a working time between a start time $t_0$ and a first time $t_1$, and may display the blur image 900 through the glasses lens 142. In an embodiment of the disclosure, the processor 120 may display the blur image 900 by synthesizing the blurred peripheral area with a specific color. The synthesized color may be determined by a user input. For example, the processor 120 may display the blur image 900, by synthesizing a green color with the blurred peripheral area.

The processor 120 may display an image 910 of a work space, without performing rendering such as blurring on the image frame during a rest time between the first time $t_1$ and a second time $t_2$. In an embodiment of the disclosure, the processor 120 may display the image 910 of the work space obtained by the camera 110 (see FIG. 2) in its original state without additional rendering. The rest time between the first time $t_1$ and the second time $t_2$ may be, for example, but is not limited to, 15 minutes.

The processor 120 may blur the peripheral area other than the at least one user-defined object by rendering the image frame during a working time between the second time $t_2$ and a third time $t_3$, and may display the blur image 900. Like in the working time between the start time $t_0$ and the first time $t_1$, the processor 120 may obtain the blur image 900 by synthesizing the blurred peripheral area even during the working time between the second time $t_2$ and the third time $t_3$ with a color determined by a user input, and may display the blur image 900 through the glasses lens 142.

The processor 120 may display the image 910 of the work space, without performing rendering such as blurring on the image frame during a rest time between the third time $t_3$ and a fourth time $t_4$. The processor 120 may display the blur image 900, by rendering the image frame during a working time between the fourth time $t_4$ and a fifth time $t_5$.

Because the augmented reality device 100 according to an embodiment of FIG. 9 selectively displays the blur image 900 in which the peripheral area other than the area corresponding to the at least one user-defined object is blurred only during the working time set by the user, a technical effect of improving concentration on the work of the user during the working time is provided. Also, because the augmented reality device 100 according to an embodiment of the disclosure synthesizes and displays the blurred peripheral area with a specific color, a special visual environment and special user experience (UX) related to the work may be provided to the user.

Figure 10:
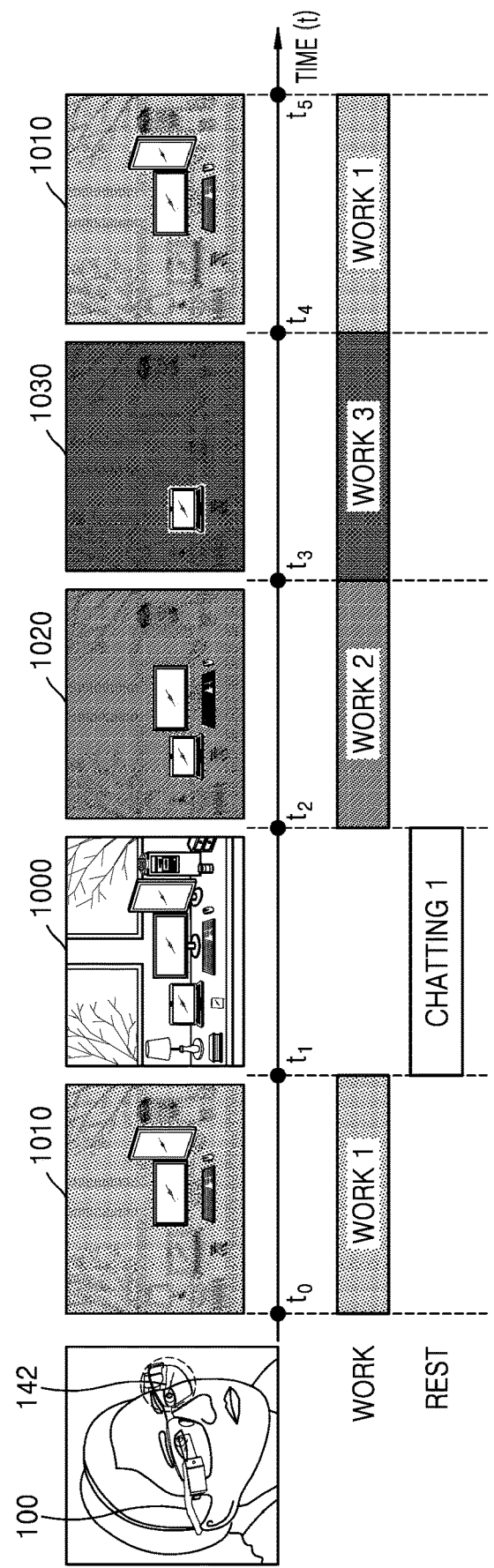
FIG. 10 is a view for describing an operation by which an augmented reality device displays different blur images according to a work type, according to an embodiment of the disclosure.

FIG. 10 is a view for describing an operation by which the augmented reality device 100 displays a different blur image according to a work type, according to an embodiment of the disclosure. The different work types may require or emphasize the use of different objects. For example, one work type, WORK 1, may require or emphasize the use of just two monitors, a keyboard, and a mouse. WORK 2 is another work type that may require or emphasize the use of one monitor, a keyboard, a mouse, and a laptop pc. Another work type, WORK 3, may require or emphasize the use of only the laptop pc.

Referring to FIG. 10, the augmented reality device 100 may display blur images 1010, 1020, and 1030 synthesized with different colors through the glasses lens 142. The processor 120 (see FIG. 2) of the augmented reality device 100 may obtain the blur images 1010, 1020, and 1030 by synthesizing a peripheral area that is blurred from among entire area of an image frame with a different color, and may display the obtained blur images 1010, 1020, and 1030 through the glasses lens 142.

In an embodiment of the disclosure, the processor 120 may synthesize the blurred peripheral area with a different color according to a work type or a work environment. In an embodiment of FIG. 10, the processor 120 may display the first blur image 1010 generated by synthesizing the peripheral area other than an area corresponding to at least one user-defined object from among all of the areas of the image with a green color during a time from a start time $t_0$ to a first time $t_1$ to perform a first work. The processor 120 may display the second blur image 1020 generated by synthesizing the peripheral area other than the area corresponding to the at least one user-defined object from among all of the areas of the image frame with a blue color during a time from a second time $t_2$ to a third time $t_3$ to perform a second work, and may display the third blur image 1030 generated by synthesizing the peripheral area with a red color during a time from the third time $t_3$ to a fourth time $t_4$ to perform a third work. The processor 120 may display the first blur image 1010 during a time from the fourth time $t_4$ to a fifth time $t_5$ to perform the first work.

In an embodiment of the disclosure, the processor 120 may determine the blurred peripheral area based on a work type and a work environment. For example, for the first blur image 1010 displayed while the first work is performed, a peripheral area other than a computer monitor from among all of the areas of the image frame may be blurred; for the second blur image 1020 displayed while the second work is performed, a peripheral area other than a laptop PC and one computer monitor from among all of the areas of the image frame may be blurred; and for the third blur image 1030 displayed while the third work is performed, a peripheral area other than the laptop PC from among all of the areas of the image frame may be blurred.

The processor 120 may display an image 1000 of a work state in an original state, without performing image rendering during a rest time, not a working time (CHATTING 1).

A user may not perform only one work but may perform multiple works. The multiple works may be different in types, work environments, and tools used for the works (e.g., a laptop PC, a desktop PC, and a tablet PC). Because the augmented reality device 100 according to an embodiment of FIG. 10 displays the blur images 1010, 1020, and 1030 in which a peripheral area is synthesized with a different color according to a type of each of a plurality of works and work environments, when the user performs various works, a technical effect of facilitating switching between works and improving concentration on a switched work is provided. Also, because the augmented reality device 100 according to an embodiment of the disclosure displays the blur images 1010, 1020, and 1030 of different colors according to types of works or work environments, a special visual environment for a work may be provided.

Figure 11:
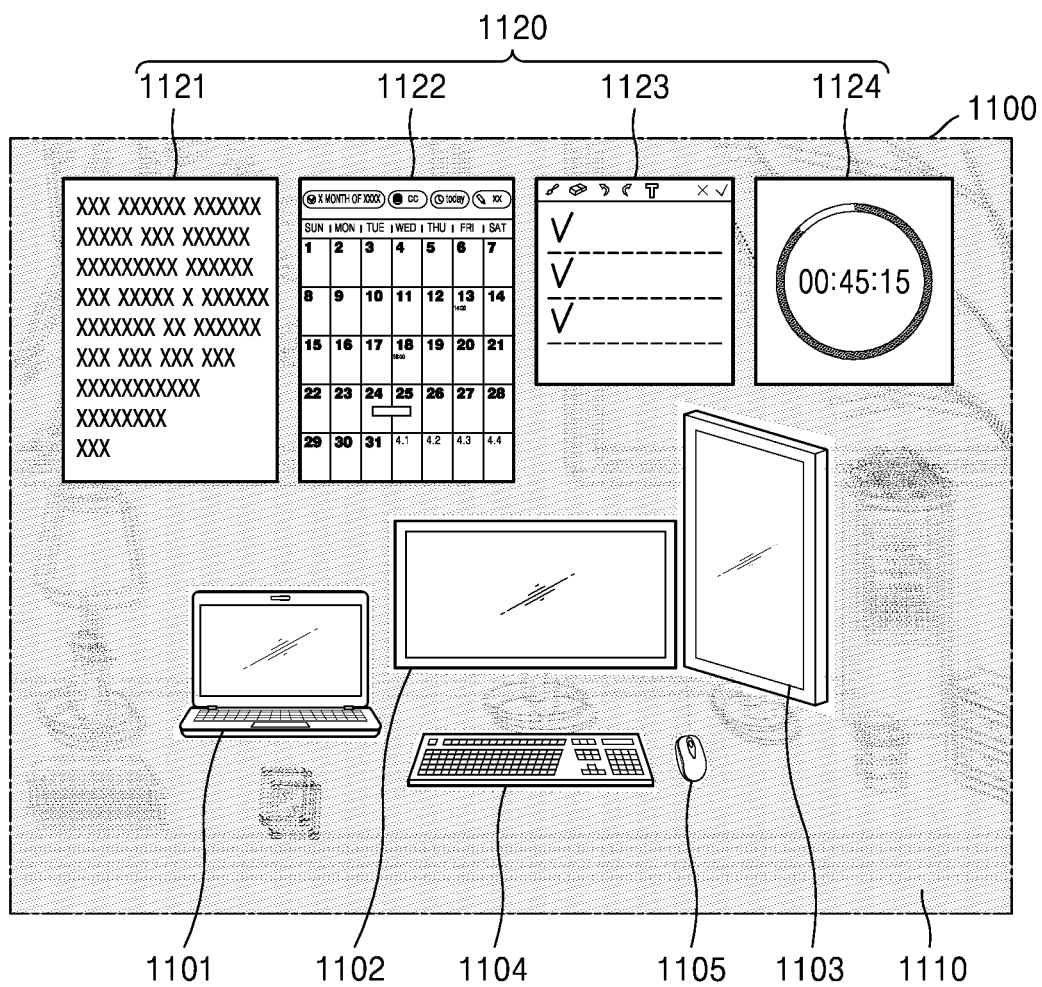
FIG. 11 is a view illustrating an operation by which an augmented reality device displays a virtual object or a graphical user interface (GUI) in a blurred area, according to an embodiment of the disclosure.

FIG. 11 is a view illustrating an operation by which the augmented reality device 100 displays a virtual object or a graphical UI in a blurred peripheral area, according to an embodiment of the disclosure.

Referring to FIG. 11, the augmented reality device 100 may display a blur image 1100 obtained by synthesizing a virtual image 1120 with a peripheral area 1110 other than an area corresponding to at least one user-defined object 1101, 1102, 1103, 1104, and 1105 from among entire area of an image frame. In an embodiment of the disclosure, the processor 120 (see FIG. 2) of the augmented reality device 100 may perform rendering for synthesizing the virtual image 1120 with the peripheral area 1110 so that the virtual image 1120 is overlaid on the peripheral area 1110 from among entire area of the blur image 1100. In an embodiment of the disclosure, the processor 120 may determine a position of the virtual image 1120 so that the virtual image 1120 does not overlap the area of the at least one user-defined object 1101, 1102, 1103, 1104, and 1105.

The virtual image 1120 may be a virtual object or a graphical UI that provides information related to a work. For example, a first virtual image 1121 may be a widget that records text or coding instructions related to the work, a second virtual image 1122 may be a calendar UI, a third virtual image 1123 may be a memo UI, and a fourth virtual image 1124 may be a timer UI. The virtual image 1120 illustrated in FIG. 11 is merely an example, and is not limited to the widget, the calendar UI, the memo UI, and the timer UI illustrated in FIG. 11.

Because the augmented reality device 100 according to an embodiment of FIG. 11 blurs the peripheral area 1110 other than the at least one user-defined object 1101, 1102, 1103, 1104, and 1105, and displays the virtual image 1120 that provides information related to the work in the peripheral area 1110 that is blurred, a technical effect of improving a user's work efficiency is provided.

Figure 12:
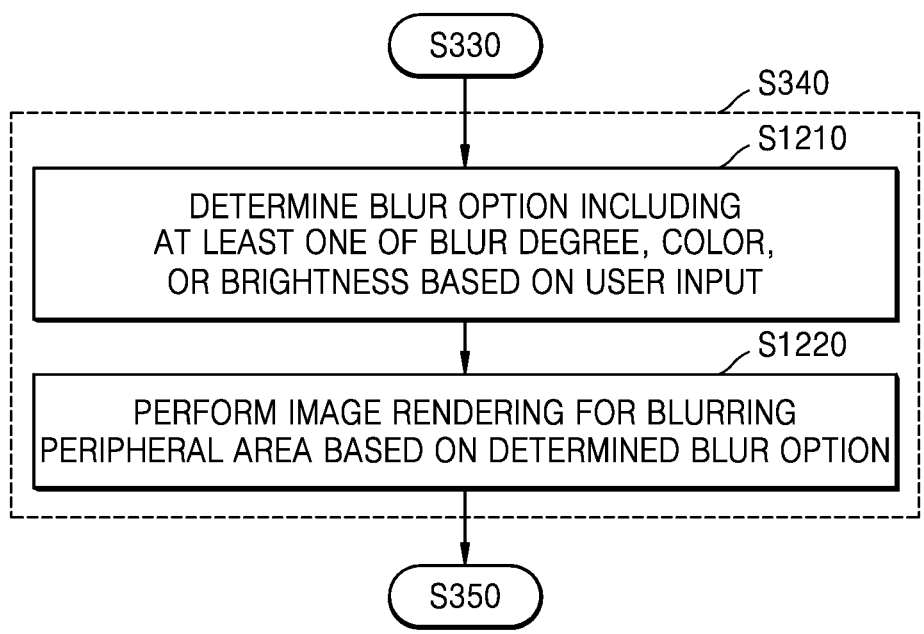
FIG. 12 is a flowchart illustrating a method by which an augmented reality device obtains a blur image according to a blur option determined based on a user input, according to an embodiment of the disclosure.

FIG. 12 is a flowchart illustrating a method by which the augmented reality device 100 obtains a blur image according to a blur option determined based on a user input, according to an embodiment of the disclosure.

Operations S1210 and S1220 illustrated in FIG. 12 are specified steps of operation S340 of FIG. 3. Operation S1210 of FIG. 12 may be performed after operation S330 of FIG. 3. After operation S1220 of 12 is performed, operation S350 of FIG. 3 may be performed.

In operation S1210, the augmented reality device 100 determines a blur option including at least one of a blur degree, a color, or a brightness based on a user input. In an embodiment of the disclosure, the augmented reality device 100 may display a virtual image including a graphical UI for selecting the blur option, and may receive a user input that selects the blur option including at least one of the blur degree, the color, or the brightness through the virtual image. In an embodiment of the disclosure, the augmented reality device 100 may include a hand tracking sensor for recognizing a position or an area indicated by a user's finger. In this case, the augmented reality device 100 may receive a user input that selects the blur option, by recognizing a position of the finger indicating the graphical UI by using the hand tracking sensor. The augmented reality device 100 may determine the blur option including at least one of the blur degree, the color, or the brightness related to a peripheral area other than at least one user-defined object from among entire area of a blur mage, based on a user input.

In operation S1220, the augmented reality device 100 performs image rendering for blurring the peripheral area based on the determined blur option. The augmented reality device 100 may obtain the blur image by performing image rendering on the peripheral area based on at least one of the blur degree, the color, or the brightness related to the peripheral area determined by the user input.

Figure 13:
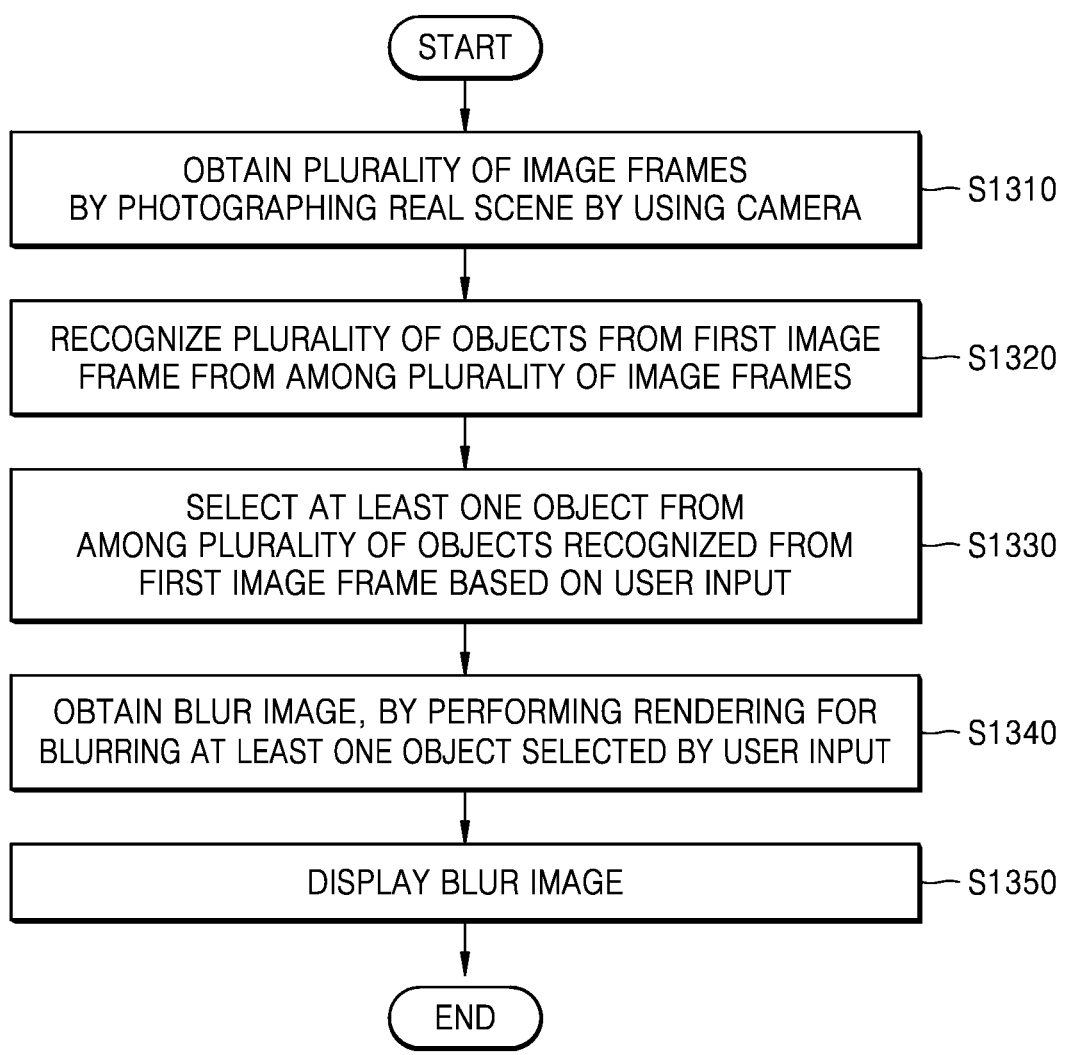
FIG. 13 is a flowchart illustrating a method of obtaining a blur image by blurring an object selected by a user input, according to an embodiment of the disclosure.

FIG. 13 is a flowchart illustrating a method by which the augmented reality device 100 obtains a blur image by blurring an object selected by a user input, according to an embodiment of the disclosure.

Figure 14:
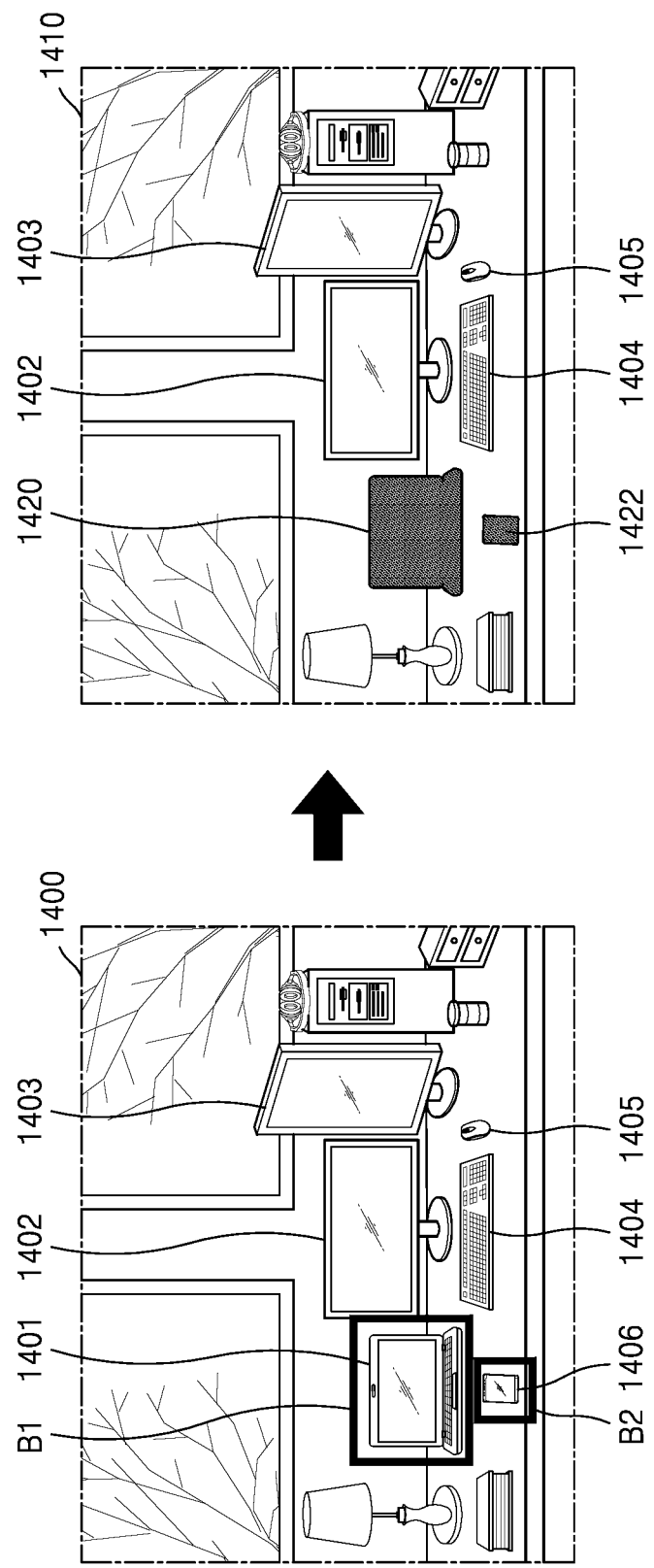
FIG. 14 is a view illustrating an operation of obtaining a blur image by blurring an object selected by a user input, according to an embodiment of the disclosure.

FIG. 14 is a view illustrating an operation by which the augmented reality device 100 obtains a blur image 1410 by blurring an object selected by a user input, according to an embodiment of the disclosure.

An operation of the augmented reality device 100 will be described with reference to FIGS. 13 and 14 together.

Referring to operation S1310 of FIG. 13, the augmented reality device 100 obtains a plurality of image frames by photographing a real scene by using the camera 110 (see FIG. 2). The real scene may be, for example, but is not limited to, a work space where a user performs a work. Operation S1310 is the same as operation S310 of FIG. 3, and thus, a repeated description will be omitted.

In operation S1320, the augmented reality device 100 detects a plurality of objects from a first image frame from among the plurality of image frames. In an embodiment of the disclosure, the processor 120 (see FIG. 2) of the augmented reality device 100 may detect the plurality of objects from the first image frame from among the plurality of image frames by using the object detection model 132 (see FIG. 2). The object detection model 132 may be implemented as, for example, region-based convolutional neural network (R-CNN), faster region-based convolutional neural network (Faster R-CNN), single shot multibox detector (SSD), YOLO v4, CenterNet, or MobileNet. However, the object detection model 132 of the disclosure is not limited to the above deep neural network model. Referring to FIG. 14 together, the processor 120 may recognize a plurality of objects 1401, 1402, 1403, 1404, 1405, and 1406 from a first image frame 1400 by using the object detection model 132.

In operation S1330, the augmented reality device 100 selects at least one object from among the plurality of objects recognized from the first image frame based on a user input. In an embodiment of the disclosure, the augmented reality device 100 may further include a user input interface for receiving a user input that selects at least one object from among the plurality of objects recognized from the first image frame. The user input interface may be a hand tracking sensor for recognizing an area or an object indicated by the user's palm or finger. In this case, the processor 120 of the augmented reality device 100 may recognize at least one object indicated by the user's finger from among the plurality of objects by using the hand tracking sensor, and may select the recognized at least one object.

Referring to FIG. 14 together, the processor 120 may recognize the user's finger indicating the first object 1401 and the sixth object 1406 from among the plurality of objects 1401, 1402, 1403, 1404, and 1405 recognized from the first image frame 1400 through the hand tracking sensor. The processor 120 may select the first object 1401 and the sixth object 1406 recognized by the hand tracking sensor. In an embodiment of the disclosure, the processor 120 may display bounding boxes B1 and B2 including the first object 1401 and the sixth object 1406 that are selected on the first image frame 1400.

However, the disclosure is not limited thereto, and the augmented reality device 100 may include a gaze tracking sensor for obtaining coordinate information of a gaze point at which the user gazes with both eyes, by obtaining information about a gaze direction of the user's both eyes. In this case, the processor 120 may recognize an object on which the gaze point stays for a preset period of time or more from among the plurality of objects 1401, 1402, 1403, 1404, and 1405, and may select the recognized object.

In operation S1340, the augmented reality device 100 obtains a blur image, by performing rendering for blurring the at least one object selected by the user input. Referring to FIG. 14 together, the processor 120 of the augmented reality device 100 may obtain the blur image 1410 by segmenting the first object 1401 and the sixth object 1406 selected by the user input from the first image frame 1400 by using the object segmentation model 136 (see FIG. 2) and then blurring image areas 1420 and 1422 corresponding to the first object 1401 and the sixth object 1406. In the blur image 1410, only the first area 1420 corresponding to the first object 1401 and the second area 1422 corresponding to the sixth object 1406 may be blurred, and the remaining objects 1402, 1403, 1404, and 1405 and a peripheral area may not be blurred.

In operation S1350, the augmented reality device 100 displays the blur image 1410 (see FIG. 14).

Because the augmented reality device 100 according to an embodiment of FIGS. 13 and 14 directly selects an object that may disturb the work of the user or reduce concentration, for example, a mobile phone (the sixth object 1406 in FIG. 14), and blurs the selected object, the blur image 1410 customized by the user may be obtained and displayed. Accordingly, the augmented reality device 100 according to an embodiment of the disclosure may improve concentration on the work of the user and may provide a user experience related to a customized work environment.

A program executed by the augmented reality device 100 described in the disclosure may be implemented in hardware, software, and/or a combination of hardware and software. The program may be executed by any system capable of executing computer-readable instructions.

The software may include a computer program, code, instructions, or a combination of one or more thereof, and may configure a processing device to operate as desired or instruct the processing device independently or collectively.

The software may be implemented as a computer program including instructions stored in a computer-readable storage medium. Examples of the computer-readable storage medium include a magnetic storage medium (e.g., a read-only memory (ROM), a random-access memory (RAM), a floppy disk, or a hard disk), and an optical recording medium (e.g., a compact disc ROM (CD-ROM), or a digital versatile disc (DVD)). The computer-readable storage medium may be distributed in computer systems connected in a network so that computer-readable code is stored and executed in a distributed fashion. The medium may be computer-readable, may be stored in a memory, and may be executed by a processor.

The computer-readable storage medium may be provided in the form of a non-transitory storage medium. In this case, "non-transitory" means that the storage medium does not include a signal and is tangible but does not distinguish whether data is semi-permanently or temporarily stored in the storage medium. For example, the 'non-transitory storage medium' may include a buffer in which data is temporarily stored.

Also, a program according to embodiments of the disclosure may be provided in a computer program product. The computer program product is a product purchasable between a seller and a purchaser.

The computer program product may include a software program and a computer-readable storage medium in which the software program is stored. For example, the computer program product may include a software program-type product (e.g., a downloadable application) electronically distributed by a manufacturer of the augmented reality device 100 or an electronic market (e.g., Samsung Galaxy Store or Google Play store). For electronic distribution, at least a portion of the software program may be stored in a storage medium or temporarily generated. In this case, the storage medium may be a server of the manufacturer of the augmented reality device 100, a server of the electronic market, or a storage medium of a relay server temporarily storing the software program.

The computer program product may include a storage medium of a server or a storage medium of the augmented reality device 100 in a system including the server and/or the augmented reality device 100. Alternatively, when there is a third device (e.g., a mobile device or a wearable device) communicatively connected to the augmented reality device 100, the computer program product may include a storage medium of the third device. Alternatively, the computer program product may include a software program transmitted from the augmented reality device 100 to the server or the third device, or transmitted from the third device to the augmented reality device 100.

In this case, at least one of the augmented reality device 100, the server, or the third device may execute the computer program product to perform a method according to embodiments of the disclosure. Alternatively, any one of the augmented reality device 100, the server, and the third device may execute the computer program product to perform the method according to the embodiments of the disclosure in a distributed fashion.

For example, the augmented reality device 100 may execute the computer program product stored in the memory 130 (see FIG. 2) to control another electronic device (e.g., a mobile device or a wearable device) communicatively connected to the augmented reality device 100 to perform the method according to the embodiments of the disclosure.

In another example, the third device may execute the computer program product to control an electronic device communicatively connected to the third device to perform the method according to the embodiments of the disclosure.

In the case that the third device executes the computer program product, the third device may download the computer program product from the augmented reality device 100 and may execute the downloaded computer program product. Alternatively, the third device may execute the computer program product provided in a pre-loaded state to perform the method according to the embodiments of the disclosure.

Although the embodiments have been described by the limited embodiments and the drawings as described above, various modifications and variations are possible by one of ordinary skill in the art from the above description. For example, the described techniques may be performed in a different order from the described method, and/or the described elements such as a computer system and a module may be combined or integrated in a different form from the described method, or may be replaced or substituted by other elements or equivalents to achieve appropriate results.

The invention claimed is:

1. An augmented reality device comprising:
a camera configured to obtain a plurality of image frames of a scene;
a display;
a memory storing information about a preset object; and
at least one processor,
wherein the at least one processor is configured to:
recognize at least one preset object corresponding to the information about the preset object from a first image frame from among the plurality of image frames obtained through the camera,
obtain a mask by segmenting an area of the recognized at least one preset object from the first image frame,
obtain a blur image in which an area other than the area of the at least one preset object is blurred, the blur image being obtained by rendering a second image frame obtained after the first image frame by using the mask during a preset first time period, and
control the display to display the blur image during the preset first time period,
wherein the at least one processor is further configured to control the display to display the second image frame in an original state without rendering during a preset second time period.

2. The augmented reality device of claim 1, wherein the at least one processor is further configured to:
detect a plurality of objects from the first image frame by using an object detection model, and
identify the at least one preset object from among the plurality of objects, wherein the at least one preset object is a user-defined object pre-defined as an object related to a work of a user.

3. The augmented reality device of claim 1, further comprising a user input interface configured to receive a user input that selects an object from among the recognized at least one preset object,
- wherein the at least one processor is further configured to obtain the mask by segmenting, from the first image frame, an area corresponding to the object selected based on the user input received through the user input interface.

4. The augmented reality device of claim 1, wherein the preset first time period is a working time for performing a work preset by a user input, and
- wherein the preset second time period is a rest time for a rest preset by the user input.

5. The augmented reality device of claim 1, wherein the at least one processor is further configured to synthesize the blurred area with a color according to a work type or a work environment.

6. The augmented reality device of claim 1, wherein the at least one processor is further configured to synthesize the blurred area with a virtual object or a graphical user interface (GUI) that provides information related to a work.

7. The augmented reality device of claim 1, further comprising a user input interface configured to receive a user input that selects at least one object from among a plurality of objects recognized from the first image frame,
- wherein the at least one processor is further configured to perform image rendering for blurring the at least one object selected by the user input received through the user input interface.

8. An operating method of an augmented reality device, the operating method comprising:
- obtaining a plurality of image frames by photographing a scene by using a camera;
- recognizing at least one preset object corresponding to information about a preset object from a first image frame from among the plurality of image frames;
- obtaining a mask, by segmenting an area of the recognized at least one preset object from the first image frame;
- obtaining a blur image in which an area other than the area of the at least one preset object is blurred, the blur image being obtained by rendering a second image frame obtained after the first image frame by using the mask during a preset first time period;
- displaying the blur image during the preset first time period; and
- displaying the second image frame in an original state without rendering during a preset second time period.

9. The operating method of claim 8, wherein the recognizing of the at least one preset object comprises:
- detecting a plurality of objects from the first image frame by using an object detection model; and
- identifying the at least one preset object from among the plurality of objects,
- wherein the at least one preset object is a user-defined object pre-defined as an object related to a work of a user.

10. The operating method of claim 8, wherein the obtaining of the mask comprises:
- selecting an object from among the recognized at least one preset object, based on a user input; and
- obtaining the mask, by segmenting an area corresponding to the selected area from the first image frame.

11. The operating method of claim 8, wherein the preset first time period is a working time for performing a work preset by a user input, and
- wherein the preset second time period is a rest time for a rest preset by the user input.

12. The operating method of claim 8, wherein the obtaining of the blur image comprises synthesizing the blurred area with a color according to a work type or a work environment.

13. The operating method of claim 8, wherein the obtaining of the blur image comprises synthesizing the blurred area with a virtual object or a graphical user interface (GUI) that provides information related to a work.

14. The operating method of claim 8, further comprising selecting at least one object from among a plurality of objects recognized from the first image frame based on a user input,
- wherein the obtaining of the blur image comprises performing image rendering for blurring the at least one object selected by the user input.

15. A computer program product comprising a non-transitory computer-readable storage medium,
- wherein the non-transitory computer-readable storage medium comprises instructions readable by an augmented reality device to cause the augmented reality device to:
  - obtain a plurality of image frames by photographing a scene by using a camera;
  - recognize at least one preset object corresponding to information about a preset object from a first image frame from among the plurality of image frames;
  - obtain a mask, by segmenting an area of the recognized at least one preset object from the first image frame;
  - obtain a blur image in which an area other than the area of the at least one preset object is blurred, the blur image being obtained by rendering a second image frame obtained after the first image frame by using the mask during a preset first time period;
  - display the blur image during the preset first time period; and
  - display the second image frame in an original state without rendering during a preset second time period.

* * * * *